(12) United States Patent
Emmett et al.

(10) Patent No.: US 9,081,609 B2
(45) Date of Patent: Jul. 14, 2015

(54) IMAGE PROCESSING SYSTEM AND METHOD EMPLOYING A THREADED SCHEDULER

(75) Inventors: Phillip J. Emmett, Salt Lake City, UT (US); Terry C. Wells, Long Beach, CA (US); Dennis L. Venable, Marion, NY (US); James E. Bollman, Williamson, NY (US); Thomas C. Rich, El Segundo, CA (US); David E. Rumph, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 1969 days.

(21) Appl. No.: 11/613,483

(22) Filed: Dec. 20, 2006

(65) Prior Publication Data

US 2007/0150877 A1 Jun. 28, 2007

Related U.S. Application Data

(60) Provisional application No. 60/752,423, filed on Dec. 21, 2005.

(51) Int. Cl.
*G06T 1/20* (2006.01)
*G06F 9/48* (2006.01)

(52) U.S. Cl.
CPC ............. *G06F 9/485* (2013.01); *G06F 9/4881* (2013.01); *G06T 1/20* (2013.01)

(58) Field of Classification Search
CPC .......... G06F 8/433; G06T 1/20; G06T 15/005
USPC ................................... 345/501–506
See application file for complete search history.

(56) References Cited

U.S. PATENT DOCUMENTS

| | | | |
|---|---|---|---|
| 6,195,676 B1* | 2/2001 | Spix et al. ...................... | 718/107 |
| 6,286,026 B1 | 9/2001 | Venable et al. | |
| 6,762,764 B2* | 7/2004 | Hiwada et al. ................. | 345/506 |
| 7,065,634 B2* | 6/2006 | Lewis et al. .................... | 712/227 |
| 7,299,458 B2* | 11/2007 | Hammes ....................... | 717/133 |
| 2001/0030647 A1* | 10/2001 | Sowizral et al. .............. | 345/420 |
| 2002/0144101 A1* | 10/2002 | Wang et al. .................... | 712/240 |
| 2003/0055668 A1* | 3/2003 | Saran et al. ....................... | 705/1 |
| 2004/0117173 A1* | 6/2004 | Ford et al. ........................ | 704/9 |
| 2004/0196497 A1* | 10/2004 | Klassen et al. ............... | 358/1.15 |

* cited by examiner

*Primary Examiner* — Charles Tseng
(74) *Attorney, Agent, or Firm* — Duane C. Basch; Basch & Nickerson LLP

(57) ABSTRACT

A system and method are disclosed for an image processing system including a threaded scheduler providing compact and efficient dataflow as a pipeline management and data flow layer.

20 Claims, 8 Drawing Sheets

IMAGE PROCESSING SYSTEM AND METHOD EMPLOYING A THREADED SCHEDULER

This application claims priority from U.S. Provisional Application 60/752,423 for an "Image Processing System and Method Employing a Threaded Scheduler," by P. Emmett et al., filed Dec. 21, 2005, which is also hereby incorporated by reference in its entirety.

A methodology is disclosed for an image processing system, and more particularly, a threaded scheduler providing compact and efficient dataflow as a pipeline management and data flow layer for use with an image processing platform.

BACKGROUND AND SUMMARY

U.S. Pat. No. 6,286,026, for a "Method and Apparatus for Integrating Pull and Push Tasks in Pipeline Data Processing," by D. L. Venable et al. (Sep. 4, 2001), hereby incorporated by reference in its entirety, teaches a device and method for processing data with a data processing string having push type and pull type tasks.

In a chunk-based image processing pipeline there needs to be a system to process each chunk of data by each processing step in an efficient manner. This system needs to control the flow of the chunks as well as the order of execution of the processing steps.

A threaded scheduler, as disclosed herein, breaks up an image processing pipeline into a collection of traces, which are a sequence of processing steps or "engines". This collection of traces is processed by one or more threads as each trace's "engines" become scheduled for execution. At the execution of each "engine", data chunks are taken from upstream "engines" and processed by the "engine". Resulting data chunks are then passed to downstream "engines". This taking/passing of chunks may schedule or block the execution of additional "engines" based on the arrival of data or the triggering of limits on links between "engines."

The Engines platform provides many powerful image processing operations in a very modular and dataflow neutral system. Although the dataflow neutral aspect is powerful, by providing integration with various dataflows, it poses a problem if one doesn't have a dataflow. The disclosed system and method fills this void by providing a compact and efficient dataflow for use with the Engines platform.

One of the disclosed embodiments processes data in chunks and supports any type of data that Engine does, including such types as compressed data. It also supports the efficient buffer management of Engines by allowing chunks to migrate down a pipeline, reducing the need for copies and re-buffering of data. The disclosed embodiments can handle simple linear pipelines to more complex pipelines, described with Directed Acyclic Graphs or DAGs, with multiple branches and joins. In accordance with the embodiment, a DAG my be made dynamically or on the fly using calls to add nodes and lines or the DAG may be saved and loaded using an extensible markup language (XML) based description. The embodiment disclosed below also supports the concept of DAGs within DAGs, by providing the ability to encapsulate a sub-DAG within a node of a larger DAG. This powerful feature allows for "code reuse" at the DAG level by having a useful DAG reused in a larger operation.

Disclosed in embodiments herein is a method for processing image data, comprising: defining a multi-trace directed acyclic graph, including breaking a directed acyclic graph for processing image data into a plurality of traces, wherein each trace is a fragment of the directed acyclic graph; and executing the multi-trace directed acyclic graph wherein each trace is executed in a separate thread.

Also disclosed in embodiments herein is a system for processing image data in a networked computing environment, comprising: an image data source; a host system, connected to said image data source via the network, wherein said host system includes an image processing pipeline, said pipeline operating on chunks of image data from said source; and memory for storing said chunks of image data during and upon completion of the data by the pipeline.

Disclosed in a further embodiment herein is an image processing pipeline, comprising: a client layer; an dataflow layer, said dataflow layer including at least one interface and service to describe, run, and feed the image-processing pipeline; and an Engine layer, wherein said dataflow layer controls the operation of at least one node in said Engine layer.

DETAILED DESCRIPTION

As used herein the term "DFlow" is employed to characterize a pipeline management and data flow layer for use with Engines. Prior to the creation of DFlow, the responsibility for connecting multiple Engines together fell to the client. With DFlow, any client may easily construct and execute Engine based image processing pipelines. The acronym DAG refers to a Directed Acyclic Graph, which is generally a graph of nodes linked together, typically where no output from one node is feed back into the node, directly or indirectly. The term "pipeline" refers to an executable DAG of Engines. A "scheduler" is an object capable of selecting tasks from a list and performing them in a reasonable order. A "chunk" is a portion of a data stream. A chunk may contain all or some of an entire stream object, and in accordance with an embodiment disclosed herein, a chunk contains an integral number of image scanlines. An Engine chunk (XEngChunk) is a structure that contains a description of a particular buffer and its contents. A "trace," given an ordered set of tasks that may branch and join (a DAG), is one possible way to traverse the task list such that all tasks are given an opportunity to run before any task is repeated. A trace may be built with an execution order in which a source runs first, then the Engine using the output of the source, then a third Engine using the output of the second, etc. A single trace may represent an entire DAG or multiple traces may be created to divide the DAG into pieces. Each trace may be executed simultaneously and asynchronously in different threads.

As set forth above the system and method disclosed herein can handle simple linear pipelines to more complex pipelines, often referred to as DAGs, including DAGS with multiple branches and joins and those with DAGs within DAGs. In one embodiment, the methods described herein may be implemented in computer software (code) and may be used to operate a computer system such as a Linux, Windows, Solaris or a Mac OSX computer platform suitable for running Engines or the like.

Figure 1:
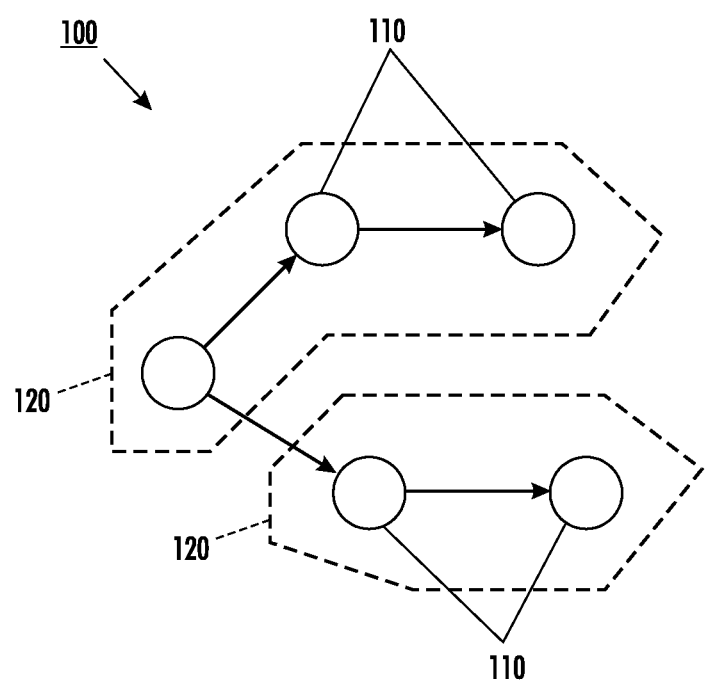
FIG. 1 is a general illustration of a directed acyclic graph in accordance with an aspect of the disclosed system and method.
Figure 2:
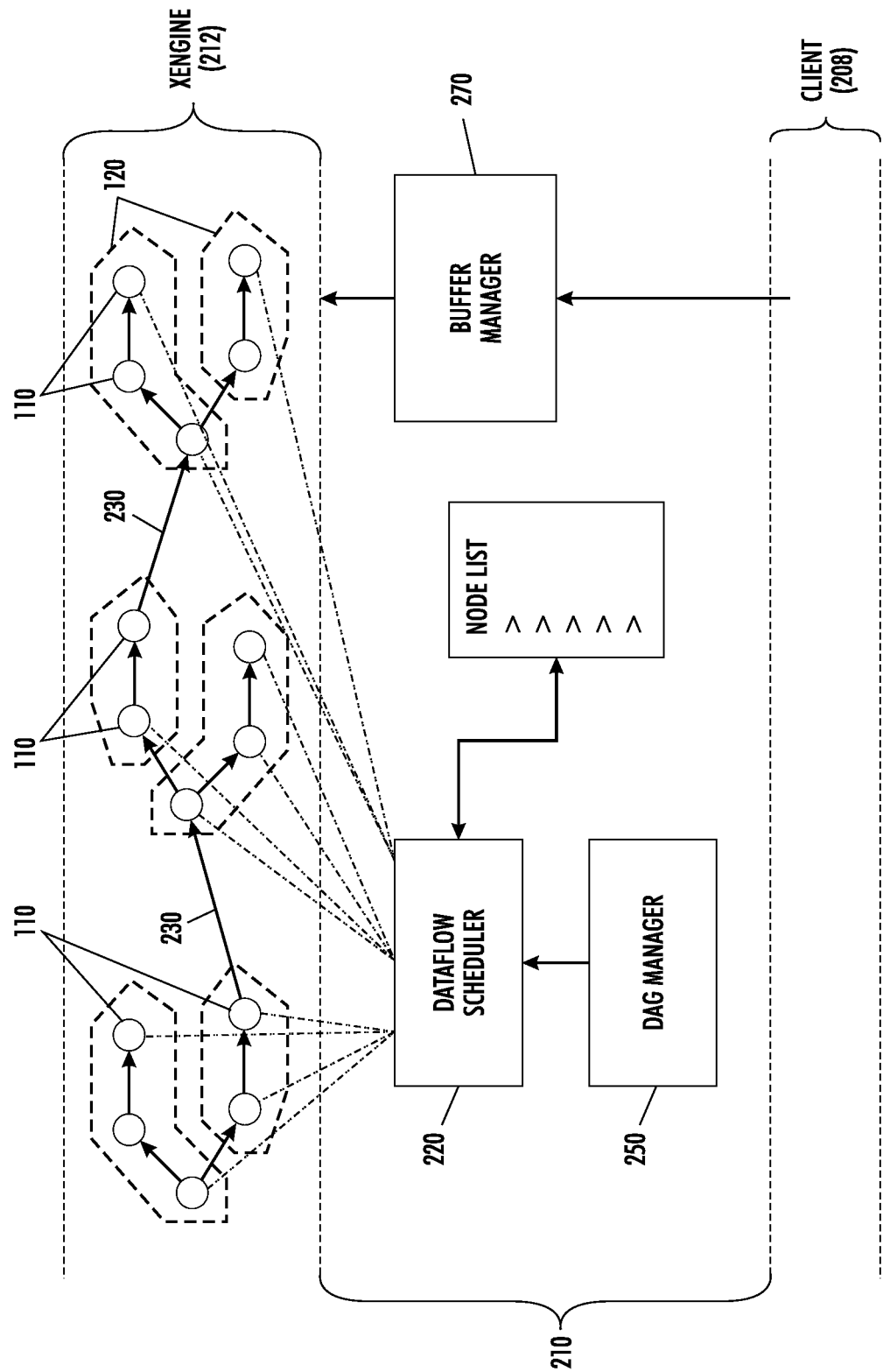
FIG. 2 is an partial illustration of a network architecture in an embodiment of the systems and methods disclosed herein.

An example of a DAG 100 is depicted in FIG. 1, where a series of nodes 110 are employed to represent various operations. Referring also to FIG. 2, at a more detailed level the system provides a monolithic dataflow layer 210 for Engines because the dataflow logic, and code, is not spread across individual processing nodes. Instead, the nodes do not talk to each other but to a single instance of the scheduler 220. Also included within the dataflow layer 210 are a DAG Manager 250 and a Buffer manager 270. DAG Manager 250 allows the client to describe the nodes and edges of a DAG, where the nodes represent the Engines and the edges represent the data flow links between them. The Buffer Manager 270 is responsible for handling the chunk buffers: migratable, non-migratable, and client-owned.

The scheduler 220 is responsible for dividing the DAG into executable traces and then creating threads to run the traces, and therefore has the job of communicating with the nodes 110, moving data between them and determining when an Engine should be executed to process more data. In essence the scheduler 220 moves down the list of nodes, executing them when they have work to do and moving the resulting chunks (not shown) to other nodes based on where the links 230 point. This approach, of having the dataflow in one object, matches well with the modular nature of Engines.

The dataflow layer 210 provides a data flow package that resides between the client (208) and the Engine (212) layers. It contains all the necessary interfaces and services to describe, run, and feed an image-processing pipeline.

A client could use the dataflow layer 210 in a variety of ways, but there are some consistent steps. Every client must start by creating a new instance of the object and end by deleting that instance. An instance of the object may be reused any number of times before it is ultimately deleted.

Figure 3:
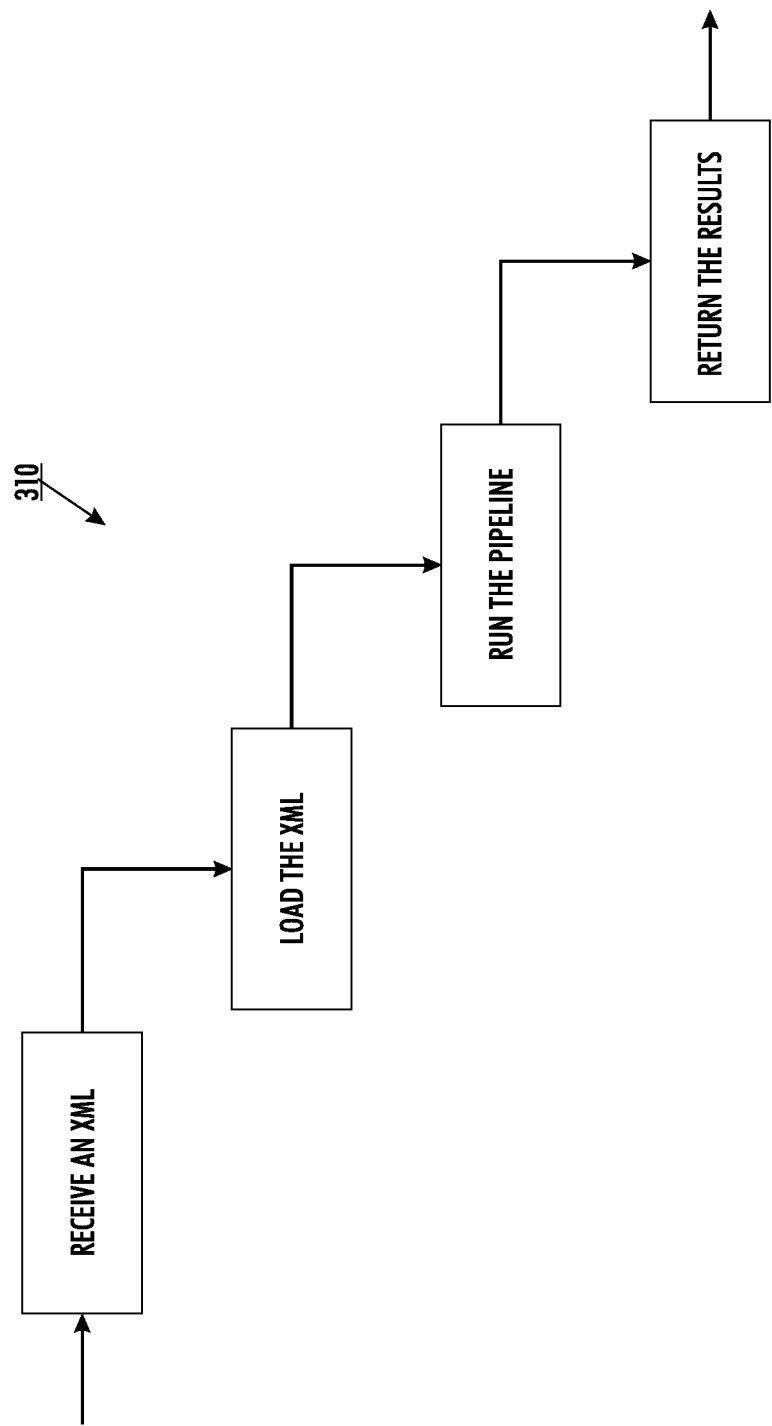
FIG. 3 is a simple flow diagram illustrating a processing pipeline in accordance with embodiments of the systems and methods disclosed herein.

One example of a client could be a DAG Editor. This type of client would use a DAG Manager API to create a DAG description and then have save the description to an XML file to be used later. Another example of a client could be a pipeline server 310 as generally illustrated by the operations depicted in FIG. 3. The pipeline server would receive an XML 320 file from a remote user, load the XML 330 into an instance, run the pipeline 340, and return the results 350 to the remote user. The system and method disclosed herein contemplate a client used by Engine and pipeline developers that would have many of these features combined. Such a system would allow the developer to edit the DAG, run the pipeline, perform pipeline debugging, and collect performance statistics.

While the disclosed system and method can execute a DAG as a complete unit, the disclosed systems and methods further contemplate a more powerful execution option—breaking a DAG 100 up into traces 120. Each trace is merely a fragment of the complete DAG 100. With a multi-trace DAG each trace is executed in a separate thread. This single DAG then has the ability to utilize more then one processor in a multi-processor system. It may also be useful on a single processor system where an Engine is waiting on a task to complete, such as an outside piece of hardware, disk, network, coprocessor, etc., and the host processor could be doing more work elsewhere on the DAG.

Currently there are two ways to fragment a DAG into traces. One is automatic and the other is manual. In the automatic embodiment, a new trace is created for each source Engine finds (readjpg, pattern, etc.), and then grows that trace by following the links out from that Engine. The manual embodiment requires the DAG developer to set a "thread-break" on selected links (e.g., 230) in the DAG. This "thread-break" will cause the DAG to fragment, and form a new trace, at this link.

Using the present system and method, it is possible to leverage the broad image processing available with Engines, providing an efficient and easy to use dataflow. With direct support for Engines, the full features of Engines can be exploited, without the need to handle the complex aspects of the dataflow.

In accordance with an embodiment of the present system and method, the threaded scheduler 220 breaks up an image processing pipeline into a collection of traces, which are a sequence of processing steps or "engines." A trace is started at each source "engine" and continues to the downstream "engines" until no remaining "engines" are available. "Engines" that already belong to a trace or are past a thread break are not added and followed. Generally, a thread break is a user settable hint on the pipeline that indicates a desired break point.

Figure 4A:
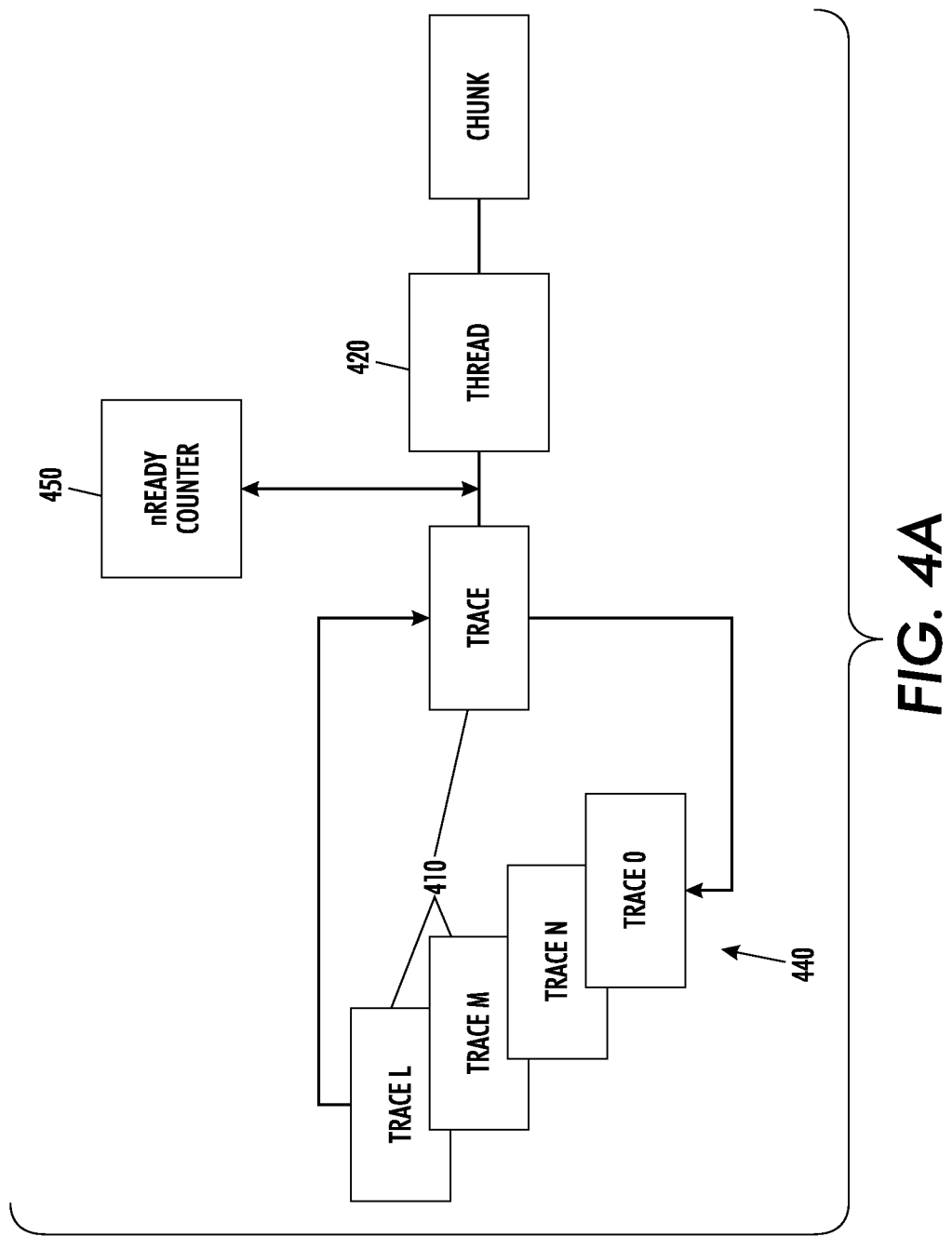
FIGS. 4A and 4B illustrate examples of the manner in which the dataflow scheduler manages traces and any associated chunks of image data.
Figure 4B:
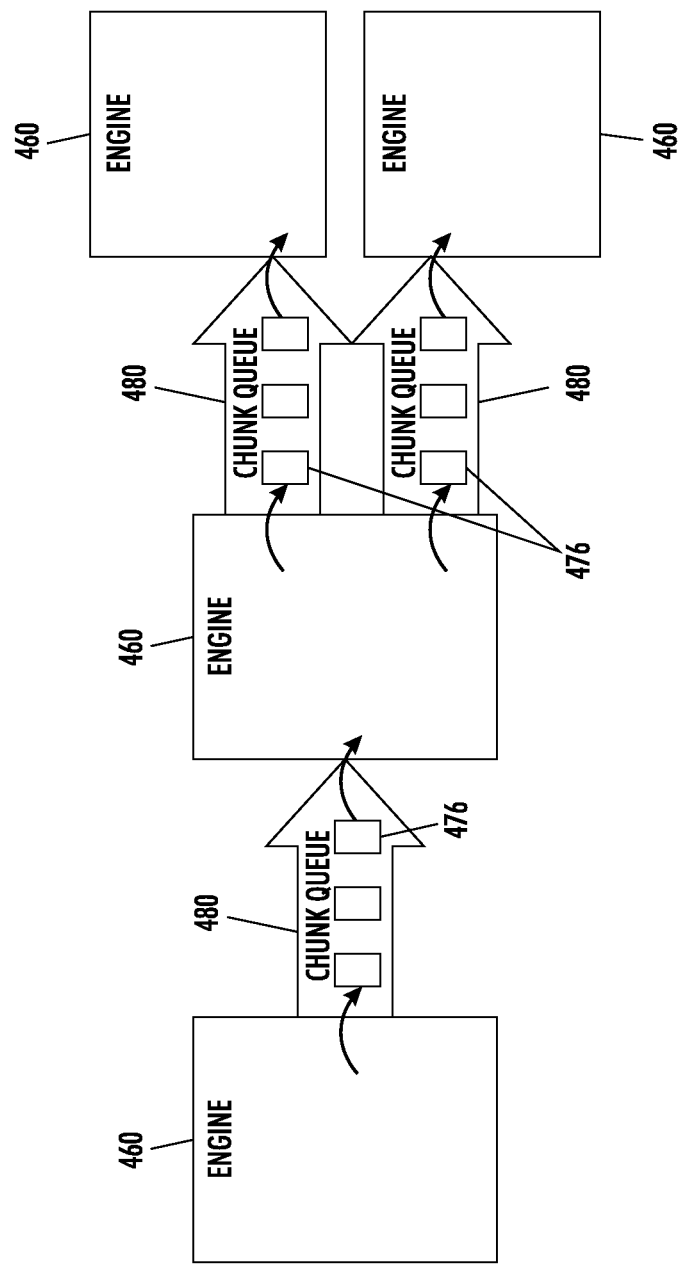

Referring next to FIGS. 4A and 4B, which depict functionality of the dataflow scheduler 220, the collection (waiting list 440) of traces 410 is processed by one or more threads 420 as each trace's "engines" become scheduled for execution by the scheduler. At most, there are as many threads as there are traces. The threads efficiently wait on the traces to be scheduled for execution. When a trace being waited on is scheduled for execution, counter 450 (nReady) is incremented. The counter indicates how many Engines are ready to execute. Subsequently, a thread awakens and takes the trace. The thread processes the trace's "engine" 460 sequence in order until the end and places the trace back into the waiting list 440. The thread then returns to waiting on the trace list.

At the execution of each "engine", data chunks 476 are taken from upstream "engines". All output queues 480 that are below a user settable level are provided with an empty chunk, the others are "plugged" with a zero sized chunk to prevent output. These chunks are then processed by the "engine" 460. Resulting data chunks are subsequently passed to downstream "engines" 460. Any unprocessed input chunks 476 are returned to their respective input queue 480 (see also waiting list 440 in FIG. 4A). If this "engine" consumed or produced any chunks then it is scheduled for execution. If the removal of the upstream chunk caused the output queue of the upstream "engine" to go below a user settable level then that "engine" will be scheduled for execution by marking its trace ready and adjusting the nReady counter accordingly. If the passing of the downstream chunk caused new data to arrive at the downstream "engine" then that "engine" will be scheduled for execution To increase the efficiency of the chunk passing, the chunks are owned by the scheduler and can migrate down the pipeline without being copied. This also allows the chunks to queue up where necessary with no additional copying. If a chunk gets branched and sent to one or more "engines" it will be marked read only and sent along with its reference count increased accordingly. The scheduler tracks the references to the chunks and frees and/or reuses the chunks when needed.

Having described the general operation of the dataflow scheduler and several examples of functionality of a system or method employing the various elements described, attention is now turned to providing more detail relative to an embodiment of the system and method. As described herein, various aspects are implemented in an object oriented design in ANSI C to match the existing Engine design and language constraints.

The system and method give the client layer the ability to describe an image processing pipeline, save that description in memory (RAM, magnetic media, etc.), load a previously saved description from memory, run the currently loaded description, and extract performance statistics. The client may choose to run a pipeline using one of the following methods:

- Non-interactive: Describe, Run, Wait for completion. This would be typical for a pipeline server that is handed a complete DAG and asked to execute it to completion.
- Interactive build: Run, Describe and test at each step, wait for completion. This method might be used by a client for a DAG that would change its shape depending on the type of image to be processed. For instance, an Engine that splits an image into its component channels doesn't know how many outputs it will have until it sees the actual image to be split. It could be RGB (3), CMYK (4), or have any number of additional tag channels (n).
- Chunked stream: Describe/Run, then Feed and Retrieve chunks interactively as indicated above relative to FIG. 4. A client that receives the input image as a chunked stream (like a web server) may wish to begin processing and return output without having to buffer the entire image. This is particularly important when running on a limited memory system where the size of a single frame buffer may exceed the total available RAM.

The client may also choose to run the directed acyclic graph in one of three threading modes:

- Client Thread: The client must call the DFlow_Process method to allow the DAG to execute. This would be necessary for an interactive pipeline debugger as well as on a platform that does not support threading.
- Limited Threads: The Scheduler will create up to a specified number of threads and run the DAG with those threads. This would be appropriate on a system with limited computing resources where the client wishes to prevent DFlow from monopolizing the CPU. This might also be a good idea for a pipeline server where many instances of DFlow may need to share the system resources.
- Unlimited Threads: The Scheduler will create as many threads as needed to have at least one thread per trace. This would be the normal mode of operation for a system requiring maximum performance. However, it is important to note that a DAG is most efficient with a few, well-selected traces.

There are several major classes employed in a system as described herein. The primary object is referred to as DFlow. A single DFlow can host a single DAG. If a client desires to have multiple concurrent DAGs, it may create multiple instances of DFlow. A DFlow object contains the collection of Engine instances, the links between them, and a scheduler object for running them. The methods of DFlow define the client API. They allow the client to create and edit a DAG description, run the pipeline, and retrieve performance and success statistics. Another class is XFEng, which represents a node in the pipeline graph. An XFEng contains the details of the node's name and parameters. Once the pipeline is running, it also holds the actual Engine instance, performance statistics, and buffer management structures. XFLink is an edge in the pipeline graph. An XFLink contains buffers that are in transition between Engines and in some cases between scheduler threads. XFBuf represents a buffer holding stream data. An XFBuf contains an XEngChunk along with enough information to chain XFBufs into a list and free them when they're done. An XFBuf may hold a chunk allocated by the DFlow layer, by an Engine, or by the client. The XFBufMgr is an XFBuf allocator class. An XFBufMgr can create XFBuf objects, free them and other tracking details. An example of the XBUf instance is the buffer manager 270 of FIG. 2. The XFScheduler represents a class responsible for creating XFThreads for executing XFTraces. Threads are controlled based on the maxThreads value set by the client and the actual number of traces. Lastly, XFParams are a class responsible for managing parameter sets and translating parameter templates into actual parameter lists. A client that creates or loads a pipeline description containing macros (a parameter template) must also provide a macro substitution list at runtime.

DFlow is the top-level object and presents the client API. DFlow has many public methods, but no public data members. To enforce this restriction in ANSI C, DFlow is implemented as an opaque structure. The following table (Table A) characterizes the DFlow Data members:

TABLE A

| Type | Name | Description |
| --- | --- | --- |
| unsigned | version | The DFlow version number. This value is filled with the constant, DFLOW_VERSION when the object is constructed and used to validate the object on later calls through the API. |
| HXFLock | lock | The DFlow state lock is used to protect the global state. |
| XFState | state | The current state of the DFlow object: Idle, Run, Pause, Complete, Error. |
| XFList <HXFEng> | Engines | The collection of XFEng objects that comprise the current DAG. |
| XFList <HXFLink> | links | The collection of XFLink objects that connect the Engines in the current DAG. |
| XEngCriticalSection | csDag | A lock for the DAG tree items. |
| HXFEng | root | The top(root) engine in the DAG tree. |
| unsigned | engineUID | A UID for new engines. |
| HXFBufMgr | bufMgr | The Buffer Manager. |
| XEngCriticalSection | csEvents | The lock for the events list and trigger. |
| XFList | statusEvents | The collection of XEngEvent objects to trigger on status change. |
| unsigned | wdTimeout | The watchdog timeout amount in milliseconds. |

TABLE A-continued

| Type | Name | Description |
|---|---|---|
| XFBool | wdTriggered | The status of the watchdog timer. |
| XEngCriticalSection | csErrorMsg | The lock for the error message. |
| XTSTR | errorMessage | Common and useful messages recorded here. |
| XFPerfCallbacks | cbacks | The performance monitoring callback functions. |
| XFScheduler | scheduler | An embedded XFScheduler object. |

Furthermore, the following tables provide further characterization of the DFlow structure: Table B characterizes the DFlow methods and objects, Table C characterizes the DAG Manager functionality; Table D characterizes the characterizes the Pipeline Runner function; Table E characterizes the Port Interface.

TABLE B

| Return Type | Name | Parameters | Description |
|---|---|---|---|
| XFResult | DFlow_Init | void | Create a new reference to the DFlow package. This will initialize any internal structures and dependencies. DFlow_Cleanup must be called once for each time that DFlow_Init is called. |
| XFResult | DFlow_Cleanup | void | Remove a reference to the DFlow package. If the last reference is removed, the internal structures are cleaned up. This function will fail if there are any outstanding DFlow object instances. DFlow_Cleanup must be called once for each call to DFlow_Init. |
| XFResult | DFlow_New | HDFlow *pDFlow | Create a new DFlow object instance. |
| void | DFlow_Delete | HDFlow DFlow | Destroy an existing DFlow object instance. |

TABLE C

| Return Type | Name | Parameters | Description |
|---|---|---|---|
| XFResult | DFlow_DAGEmpty | HDFlow dflow | Discard the current DAG description. |
| XFResult | DFlow_DAGLoad | HDFlow dflow XEngIO *io | Load a new DAG description from an XML representation. An XEngIO object is used to abstract the I/O source. Any existing DAG description is discarded. (For details on XEngIO, please refer to the Engine API docs.) |
| XFResult | DFlow_DAGSave | HDFlow dflow XEngIO *io | Save the current DAG description to a serialized representation. An XEngIO object is used to abstract the I/O destination. |
| XFResult | DFlow_DAGAddXEng | HDFlow dflow XCTSTR iName XCTSTR mName const XFParams *params void *clientData HXFEng *Instance unsigned linkCount ... | Adds an Engine to the DAG. iName must be a unique name for this instance of the Engine. If iName is NULL, then a unique name will be generated automatically. mName is the name of the Engine type of which to create an instance. params specifies the parameter set to be stored in the DAG. clientData is a pointer to a client private data block. This may be NULL. instance may hold a reference to an XFEng. If non-NULL, a handle to the new XFEng will be returned. This handle may then be used for other operations. linkCount indicates the number of input links to create along with the instance. "is the variable arg list of input links specified as: |

TABLE C-continued

| Return Type | Name | Parameters | Description |
| --- | --- | --- | --- |
| | | H XFEng srcInst, unsigned srcIx | pairs. The order of the pairs maps to the order of the input chunks on the new instance. |
| XFResult | DFlow_DAGAddXEngEx | HDFlow dflow<br>HXFEng parent<br>XCTSTR iName<br>XCTSTR mName<br>const XFParams *params<br>unsigned flags<br>void *clientData<br>HXFEng *instance<br>unsigned linkCount<br>... | Adds an Engine to the DAG as a child node to another XFEng node. The function works like DFlow_DAGAddXEng with addition of the parent field and the flags field. The flags is a bitwise or'd field. If XF_ENG_AUTOFORMAT is used then the Engine will have autoformat before it in the pipeline. When child nodes are added to a parent node they act as a sub-DAG under the parent node. The child nodes can be linked together and to the input and outputs of the parent. A NULL parent is valid and is the same as using DFlow_DAGAddXEng. |
| XFResult | DFlow_DAGDeleteXEng | HDFlow dflow<br>HXFEng instance | Deletes an Engine instance. Any links attached to the instance are also deleted. |
| XFResult | DFlow_DAGAddLink | HDFlow dflow<br>HXFEng srcInst<br>unsigned srcChunkIx<br>HXFEng destInst<br>unsigned destChunkIx<br>unsigned wantsDataThreshold<br>XFBool threadBreak | Creates a new link from the output of one XFEng instance to the input of another. If the new link conflicts with any existing link, the original link is removed.<br>The two XFEng nodes must be siblings (have the same parent) or one must be the parent of the other. The same node may be used as both the source and destination, it will cause the input of the node to be directly wired to the output.<br>A NULL node may be used, it represents the top (root) node of the DAG. The inputs and outputs of the top node are the ports of the DAG and can be driven using the Port Interface functions.<br>srcInst and srcChunkIx specify the instance and output chunk index of the source Engine.<br>destInst and destChunkIx specify the instance and input chunk index of the destination Engine.<br>wantsDataThreshold indicates the throttle threshold on this link. XF_MAX_DEPTH specifies that the queue is not throttled. (See XFLink for more details.)<br>threadBreak is a hint to the scheduler that the downstream XEng should be in a different thread than the upstream XEng.<br>A thread break will only be created if threading is actually enabled. |
| XFResult | DFlow_DAGDeleteLink | HDFlow dflow<br>HXFEng instance<br>unsigned chunkIx<br>XFBool input | Deletes a link by specifying either the source or the destination point of the link. If the referenced point is an input, then just the one link is deleted. If the point is an output, then all links from that point are deleted. |
| HXFEng | DFlow_DAGGetXEngInst | HDFlow dflow<br>XCTSTR iName | Locates and returns the Engine instance with the specified name. Returns NULL if the name is not found. |
| HXFEng | DFlow_DAGGetXEngInstEx | HDFlow dflow<br>HXFEng instance<br>XCTSTR iName | Locates and returns the child Engine instance with the specified name. Returns NULL if the name is not found. |
| XFResult | DFlow_DAGGetFuncDesc | HDFlow dflow<br>XEngFuncDesc *funcDesc | Fills a preallocated XEngFuncDesc with the formal arguments of the current pipeline. The argument list is generated by scanning the Engine parameters for macros and compiling the results. The resulting XEngFuncDesc may be |

TABLE C-continued

| Return Type | Name | Parameters | Description |
| --- | --- | --- | --- |
| | | | passed directly to XEngCmdLnToArgv for converting command line parameters into a parameter substitution list suitable for passing to DFlow_PipeRun. |
| XFResult | DFlow_DAGRename | HDFlow dflow HXFEng instance XCTSTR newName | Renames the XFEng instance specified by the provided handle to a new name. This replaces the unique ID string with a new one that must conform to all the unique ID string rules. |
| XFResult | DFlow_DAGSetParams | HDFlow dflow HXFEng instance const XFParams *params | Replaces the current parameter set with a new one. |
| XFResult | DFlow_DAGSetClientData | HDFlow dflow HXFEng instance void *clientData | Store the pointer to a client data block in the specified Engine instance. |
| XFResult | DFlow_DAGGetClientData | HDFlow dflow HXFEng instance void **clientData | Retrieve the pointer to the client data block from the specified Engine instance. |
| XFResult | DFlow_DAGGetXEngInfo | HDFlow dflow HXFEng instance XFEngineInfo *info | Fills a client-supplied XFEngineInfo struct with information about the specified XFEng instance. |
| XFResult | DFlow_DAGGetXEngPerfStats | HDFlow dflow HXFEng instance XFPerfStats *stats | Fills a client-supplied XFPerfStats struct with performance statistics about the specified XFEng instance. |
| XFResult | DFlow_DAGSetStateEventCallback | HDFlow dflow HXFStateEventFunc pFunc void *clientData | Sets the state event callback function. The supplied function will be called each time an XEng in the DAG changes state. Set pFunc to NULL to disable callbacks. |
| XFResult | DFlow_DAGSetDataEventCallback | HDFlow dflow HXFDataEventFunc pFunc void *clientData | Sets the data event callback function. The supplied function will be called each time an XEng in the DAG receives or sends a block of data. Set pFunc to NULL to disable callbacks. |
| XFResult | DFlow_DAGSetInputName | HDFlow dflow HXFEng instance unsigned idx XCTSTR name | Sets the name for an input of an XFEng instance. |
| XFResult | DFlow_DAGSetOutputName | HDFlow dflow HXFEng instance unsigned idx XCTSTR name | Sets the name for an output of an XFEng instance. |
| XFResult | DFlow_DAGFindInput | HDFlow dflow HXFEng instance unsigned *idx XCTSTR name | Finds the input of an XFEng instance with the name given. |
| XFResult | DFlow_DAGFindOutput | HDFlow dflow HXFEng instance unsigned *idx XCTSTR name | Finds the output of an XFEng instance with the name given. |

TABLE D

| Return Type | Name | Parameters | Description |
| --- | --- | --- | --- |
| XFResult | DFlow_PipeRun | HDFlow dflow unsigned maxThreads char *paramsList[ ] XCTSTR logBase | Places the Pipeline into the Run state. No Engines will actually be initialized during this call. The client may specify the maximum allowable scheduler threads and a parameter substitution list at this time. If maxThreads is set to XF_UNLIMITED_THREADS, then the scheduler will create as many threads as there are traces. paramsList references the parameter substitution list. logBase is the base pathname for generating performance logfiles for this run. If logBase is NULL, then performance logging is suppressed. |
| XFResult | DFlow_PipeWaitForInit | HDFlow dflow HXFEng instance unsigned timeout | Waits for a specific XFEng instance to complete initialization. If no XFEng is specified, waits for the entire pipeline to initialize. The client may provide a timeout. DFlow_PipeProcess will be called internally in the client thread mode. |
| XFResult | DFlow_PipeProcess | HDFlow dflow XFBool singleStep | Allows the scheduler to run when DFlow is in the client thread mode. The scheduler will run either one or all Engines in the pipeline before returning, depending on the singleStep flag. This function returns immediately in either the limited or unlimited thread modes. |
| XFResult | DFlow_PipePause | HDFlow dflow | Stops the scheduler but retains the pipeline state. This can be useful for inspecting the pipeline for errors or other status. Call DFlow_PipeContinue to continue processing. This call will return XF_FAIL if DFlow is not in the Run state. |
| XFResult | DFlow_PipeContinue | HDFlow dflow | Restarts the scheduler from the Pause state. This call will return XF_FAIL if DFlow is not in the Pause state. |
| XFResult | DFlow_PipeWaitForComplete | HDFlow dflow unsigned timeout XFBool *allComplete XFBool *errorDetected | Allows the client to go into an efficient wait state until the entire pipeline completes processing or an error or timeout occurs. The completion or error status of the pipeline is returned in allComplete and errorDetected. DFlow_PipeProcess will be called internally when in client thread mode. |
| XFResult | DFlow_PipeWaitFor | HDFlow dflow unsigned timeout unsigned *pStatus | Allows the client to go into an efficient wait state until the entire pipeline completes processing or an error or timeout or watchdog timeout occurs. The resulting status is returned in the pStatus. DFlow_PipeProcess will be called internally when in client thread mode. |
| XFResult | DFlow_PipeCleanup | HDFlow dflow | Releases all scheduler and pipeline state information. DFlow returns to the Idle state. |
| XFResult | DFlow_PipeAllComplete | HDFlow dflow XFBool *allComplete | Queries the pipeline to see if all Engines have completed without any errors. |
| XFResult | DFlow_PipeAllRunning | HDFlow dflow XFBool *pAllRunning | Queries the pipeline to see if all the Engines are still running. This implies none are complete and there are no errors. |
| XFResult | DFlow_PipeErrorDetected | HDFlow dflow XFBool *pErrorDetected | Queries the pipeline to see if any Engines have posted an error. |
| XFResult | DFlow_PipeGetStatus | HDFlow dflow unsigned *pStatus | Queries the pipeline and state flags for the current status. |

TABLE D-continued

| Return Type | Name | Parameters | Description |
|---|---|---|---|
| XFResult | DFlow_PipeAddEvent | HDFlow dflow XEngEvent *event | Adds an event to the dispatch list. This event will be triggered when a status change occurs. |
| XFResult | DFlow_PipeRemoveEvent | HDFlow dflow XEngEvent *event | Removes an event from the dispatch list. |
| XFResult | DFlow_PipeSetWDTimeout | HDFlow dflow unsigned timeout | Sets the watchdog timeout in milliseconds. The default is 60 seconds. If no work is performed within this timeout the watchdog is triggered. |
| XFResult | DFlow_PipeResetWD | HDFlow dflow | Resets the state of watchdog timeout. |
| XFResult | DFlow_PipeGetErrorMsg | HDFlow dflow XTSTR *msg | Queries the pipeline to see if any Engines have posted an error message. |

TABLE E

| Return Type | Name | Parameters | Description |
|---|---|---|---|
| XFResult | DFlow_PortGetInputCount | HDFlow dflow unsigned *count | Queries the pipeline to see how many input ports are available. This information is also returned with DFlow_DAGGetFuncDesc. |
| XFResult | DFlow_PortSendHeader | HDFlow dflow unsigned idx XEng HeaderStruct *hdr | Sends a header into an input port. The header is duplicated to aid tracking and ownership issues. |
| XFResult | DFlow_PortSend | HDFlow dflow unsigned idx XEngChunk *chunk | Sends a chunk into an input port. The chunk is duplicated to aid tracking and ownership issues. |
| XFResult | DFlow_PortGetInputStatus | HDFlow dflow unsigned idx unsigned *status | Gets the status of an input port. |
| XFResult | DFlow_PortSetInputEvent | HDFlow dflow unsigned idx XEngEvent *event | Sets the status event of an input port. This event is triggered when the port status changes. |
| XFResult | DFlow_PortSetInputError | HDFlow dflow unsigned idx | Marks an input port as having an error. |
| XFResult | DFlow_PortGetOutputCount | HDFlow dflow unsigned *count | Queries the pipeline to see how many output ports are available. This information is also returned with DFlow_DAGGetFuncDesc. |
| XFResult | DFlow_PortRecvHeader | HDFlow dflow unsigned idx XEngHeaderStruct **hdr | Recieves a header from an output port. The header is duplicated to aid tracking and ownership issues. This call does not block, it is an error if the header is not ready. |
| XFResult | DFlow_PortRecv | HDFlow dflow unsigned idx XEngChunk *chunk | Recieves a chunk from an output port. The chunk is duplicated to aid tracking and ownership issues. This call does not block, it is an error if a chunk is not ready. The chunk parameter can be NULL which just discards the next available chunk. |
| XFResult | DFlow_PortPeek | HDFlow dflow unsigned idx XEngChunk *chunk | Returns a reference to a chunk from an output port. The chunk is not duplicated nor is it removed from the output. The chunk should be removed with DFlow_PortRecv when the next chunk is needed. This call does not block, it is an error if a chunk is not ready. |
| XFResult | DFlow_PortGetOutputStatus | HDFlow dflow unsigned idx unsigned *status | Gets the status of an output port. |
| XFResult | DFlow_PortSetOutputEvent | HDFlow dflow unsigned idx XEngEvent *event | Sets the status event of an output port. This event is triggered when the port status changes. |

TABLE E-continued

| Return Type | Name | Parameters | Description |
| --- | --- | --- | --- |
| XFResult | DFlow_PortSetOutputError | HDFlow dflow unsigned idx | Marks an output port as having an error. |

Figure 5:
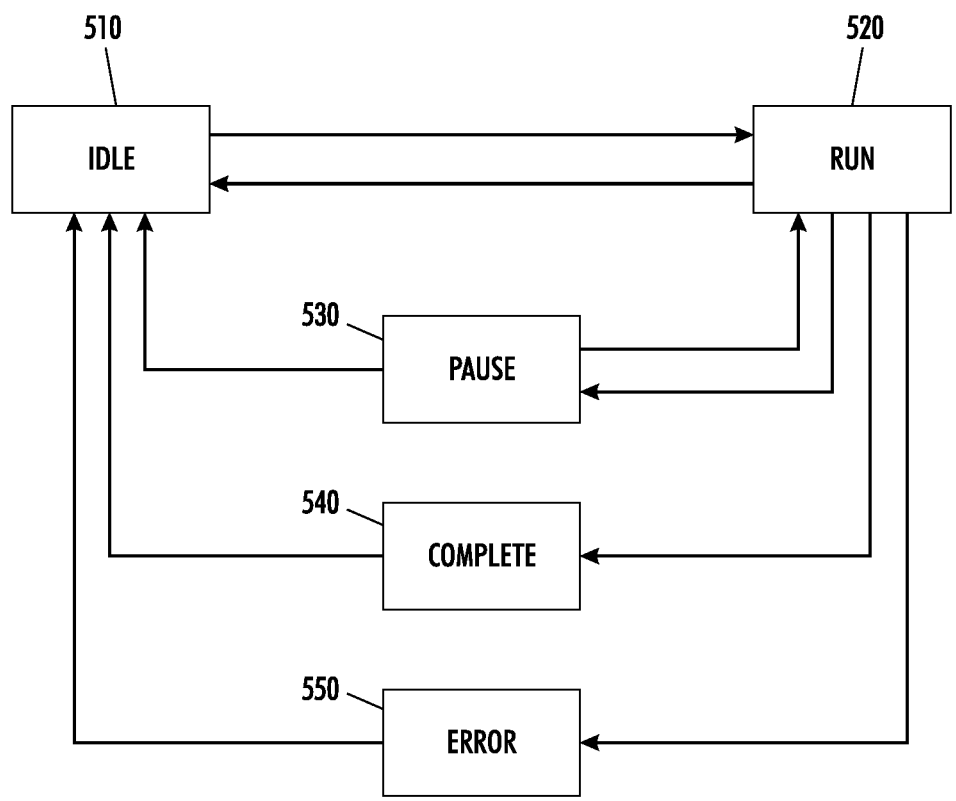
FIGS. 5 and 6 are state diagrams illustrating the general operation of the scheduling and mapping operations for the disclosed system and method.

Having described the DFlow object in general, the Detailed Dynamic Model will now be set forth and described with reference to FIG. 5. The DFlow object has five states: Idle (510), Run (520), Pause (530), Complete (540), and Error (550). DFlow is initialized to the Idle state 510, and may be moved to the Run state 520 at any time by calling the DFlow_PipeRun method. DFlow will not return to the Idle state until DFlow_PipeCleanup is called.

When in the Run state 520, DFlow will create new scheduler traces and start running. All sources will be initialized along with the Engines they feed. Data will begin flowing down the pipeline. The data flow will block if it reaches an unconnected output. The client may add new Engines to unconnected outputs at any time, thus allowing the dynamic construction of a pipeline. The client may not remove or alter an individual Engine once it has been initialized since the stream cannot be "rewound" and reprocessed with a new Engine. New sources may, however, be added at any time while in the Run state.

From the Run state 520, DFlow may move to Idle 510, Pause 530, Complete 540, or Error 550. DFlow_PipeCleanup will cause a return to Idle. DFlow_PipePause will set the Pause state. The completion of all Engines will set the Complete state 540. The error of any Engine will set the Error state 550. DFlow will remain in Pause until the client calls DFlow_PipeRun to continue processing or DFlow_PipeCleanup to return to the Idle state 510. DAG changes in the Pause state 530 have the same restrictions as in the Run state 520. Lastly, DFlow will remain in Complete 540, or Error 550 until DFlow_PipeCleanup is called. This allows the client to review the pipeline state if desired. (e.g. for a post-mortem.) All DAG changes are prohibited in the Complete and Error states, 540 and 550, respectively.

From the functional perspective, when an Engine instance is added using the DFlow_DAGAddXEng method, it is placed in an instance array. If any links are specified as arguments on this call, they are added to the Link array and connected from the outputs of the specified Engine instance(s) to the inputs of the new Engine. When Links are added using the DFlow_DAGAddLink method, they are placed in the Link array. They are also connected to their respective source and destination Engine instances.

As mentioned in the dynamic model described above, new Engines and links may be added to unconnected outputs of the DAG even when DFlow is in the Run state 520. If this occurs, the dataflow scheduler must regenerate its traces before continuing. Also, recall that an Engine or Link may not be removed once it has been initialized; DFlow_PipeCleanup must be called first.

One problem with dynamically building a pipeline arises when adding a branch to a partially initialized pipeline. Imagine a source feeding a single Engine (not a Sink). When run, the source and Engine will initialize and begin processing the stream. A portion of the stream will move out of the source and into the Engine where it will block due to the unconnected output. In this state, an attempt to add a new Engine that connects to the source (as a tee-branch) will fail because a portion of the stream has already moved out of the source and cannot be repeated.

Having described the dynamic and functional aspects of DFlow, attention is directed to the following information, which is related to the XFEng detailed design. Generally, an XFEng object represents an Engine in the DAG, hosts the Engine instance, and handles its execution state and data flow control.

In the following detailed object model: Table F characterizes the XFEng Data Members; and Table G characterizes the XFEng Methods.

TABLE F

| Type | Name | Description |
| --- | --- | --- |
| unsigned | valid | Magic number that identifies a valid XFEng object. This field is set to XFLOW_ENGINE when the object is constructed and used to validate the instance when its methods are called. |
| HXFLock | lock | Lock for the instance. |
| XTSTR | iName | Unique instance name: readint1, invert1, etc. |
| XTSTR | mName | Engine type name: readint, invert, etc. |
| XFParams | params | The parameter or template set. |
| unsigned | flags | Engine flags, currently only autoformat. |
| void * | clientData | The pointer to the client's private data block. |
| XEngFuncDesc | *desc | The function description (containing the argument list and init point) for the associated Engine. This value is set during XFEng_New if the xeng library is available. Otherwise it is left as NULL until it is time to init the Engine. |
| XFEngState | state | The current position of this instance in the execution state machine. |
| XFBool | hadData | This flag indicates that the last call to Process returned output data. |
| XFBool | usedData | This flag indicates that the last call to Process used input data. |
| XFBool | canContinue | This flag indicates that the last call to Process returned the status XENG_CAN_CONTINUE and thus wishes to be called again, even in the absence of new input data (or output space). |

TABLE F-continued

| Type | Name | Description |
| --- | --- | --- |
| XEngState * | xeState | The pointer to the Engine state. This value is NULL before the Engine Init function is called. |
| XFArray <HXFInput> | input | The array of XFInput handlers. This array maps directly to the input chunks on the Engine. |
| XFArray <HXFOutput> | output | The array of XFOutput handlers. This array maps directly to the output chunks on the Engine. |
| XFPerfStats | perf | The struct containing the performance statistics for this instance. |
| HXFEng | afhandle | Reference to autoformat Engine. |
| HXFEng | ophandle | Reference to the actual Engine in autoformat mode. |
| HXFEng | parent | Reference to parent Engine, NULL for root node. |
| XFList <HXFEng> | children | List of child Engines: <HXFEng> |
| HDFlow | dflow | Reference to DFlow instance. |
| HXFScheduler | scheduler | Reference to the scheduler. Will be NULL when DFlow is in the Idle state. |
| XEngEvent * | traceEvent | Reference to the trace event. |

TABLE G

| Return Type | Name | Parameters | Description |
| --- | --- | --- | --- |
| XFResult | XFEng_New | HDFlow dflow<br>HXFEng parent<br>XCTSTR iName<br>XCTSTR mName<br>const XFParams *params<br>unsigned flags<br>HXFEng *pxEng | Creates and initializes a new XFEng. Node will be placed under parent node, which may be NULL.<br>See DFlow_DAGAddXEng for details on iName, mName, flags and params. |
| void | XFEng_Delete | HXFEng xeng | Cleans up and deletes an XFEng instance. |
| XFResult | XFEng_SetInputLink | HXFEng xeng<br>unsigned chunkIx<br>HXFLink link<br>HXFLink *pOldLink | Sets the input link for the specified chunkIx to be link. The previous link on that chunk, if any, is returned in pOldLink. |
| XFResult | XFEng_AddOutputLink | HXFEng xeng<br>unsigned chunkIx<br>HXFLink link | Adds link as a new output branch to the specified chunkIx.<br>Returns XF_FAIL if xeng has already produced data on this output. |
| XFResult | XFEng_RemoveOutputLink | HXFEng xeng<br>unsigned chunkIx<br>HXFLink link | Removes link from the list of outputs on the specified chunkIx.<br>Returns XF_FAIL if link was not attached to the output or if xeng has been initialized. |
| XFResult | XFEng_RemoveAllOutputLinks | HXFEng xeng<br>unsigned chunkIx<br>XFArray *pLinks | Removes all the links from the specified chunkIx. The list of links that were formerly attached are copied into the client-provided XFArray pointed to by pLinks.<br>Returns XF_FAIL if xeng has been initialized. |
| XFResult | XFEng_Rename | HXFEng xeng<br>XCTSTR iName | Renames xeng to be iName. |
| XFResult | XFEng_SetParams | HXFEng xeng<br>const XFParams *params | Sets a new parameter set for xeng. |
| XFResult | XFEng_GetInfo | HXFEng xeng<br>XFEngineInfo *pInfo | Fills the client-provided XFEngineInfo structure. All fields are shallow copies and must not be freed by the caller. |
| XFResult | XFEng_GetPerfStats | HXFEng xeng<br>XFPerfStats *pStats | Fills the client-provided XFPerfStats structure. |
| XFResult | XFEng_Start | HXFEng xeng<br>HXFScheduler scheduler | Move the XFEng from the Idle state to the ToInit state.<br>This method returns XF_FAIL if the XFEng is not in the Idle state. |

TABLE G-continued

| Return Type | Name | Parameters | Description |
|---|---|---|---|
| XFResult | XFEng_Schedule | XFEng xeng HXFScheduler scheduler XEngEvent *traceEvent | Informs this node that it has been scheduled and the trace event is. |
| XFBool | XFEng_IsStarted | HXFEng xeng | Queries the XFEng to see if it has been started. |
| XFBool | XFEng_IsScheduled | HXFEng xeng | Queries the XFEng to see if it has already been scheduled. |
| XFBool | XFEng_IsComplete | HXFEng xeng | Queries the XFEng to see if it is complete. A node is complete once all child nodes are complete and EODs have passed all inputs and outputs. |
| XFResult | XFEng_SignalTraceEvent | HXFEng xeng | Sets the trace event. This may trigger this nodes trace to be run. |
| XFResult | XFEng_Process | HXFEng xeng const XFParamMap *paramMap | Runs the XFEng through one cycle of its state machine. What happens depends on the state and the available buffers. See 6.2.3 for details. Idle, Complete, Error: Do nothing. ToInit: Collect input headers and then call the Engine Init point. The contents of paramMap are used to resolve any parameter macros. No Valid Outputs: Collect input data and then call the Engine Process point. Running: Collect input data and output buffers, call the Engine Process point, and reconcile the status of all buffers. |
| XFResult | XFEng_Cleanup | HXFEng xeng | Performs the steps necessary to call the Engine end point until the Engine is destroyed and then dispose of any held buffers. This function may be called at any time to return to the Idle state. |

As will be appreciated, the XFEngine employs various internal classes and operations. The XFEngineInfo class (Table H) is filled from information in the XFEng instance. The XFPerfStats class (Table I) is stored within the XFEng class and copied out on request from the client. Table J illustrates the XFStats in accordance with an embodiment of the system described herein.

TABLE H

| Type | Name | Description |
|---|---|---|
| XCTSTR | iName | The unique instance name. |
| XCTSTR | mName | The Engine type name. |
| XFParams * | pParams | The parameter or template set. |
| XFEngState | state | The current state of the XFEng. |
| XEngState | xeState | A copy of the public portion of the Engine state structure. |

TABLE I

| Type | Name | Description |
|---|---|---|
| unsigned | nInputs | The number of input ports. |
| XFStats | input[ ] | The statistics blocks for the input side. The size of this array is set by the XF_MAX_PORT_STATS constant. |
| unsigned | nOutputs | The number of output ports. |
| XFStats | output[ ] | The statistics blocks for the output side. The size of this array is set by the XF_MAX_PORT_STATS constant. |
| XEngInt64 | init | The number of ticks charged to initialization. |
| XEngInt64 | work | The number of ticks charged to process calls that produced results. |
| XEngInt64 | overhead | The number of ticks charged to the management overhead. |

TABLE J

| Type | Name | Description |
|---|---|---|
| unsigned | buffers | The total number of buffers filled/consumed |
| unsigned | bytes | The number of bytes processed. |
| unsigned | tBytes | The total number of bytes expected on this port. This will be set to zero if the total byte count is not known at the start of processing and for non-image types. |
| unsigned | scanlines | The total number of scanlines processed. |
| unsigned | tScans | The total number of scanlines expected on this port. This will be set to zero for non-image types. |
| unsigned | pixels | The number of pixels processed. |

The XFInput and XFOutput classes, Table K and Table L, respectively, are use to handle the mapping of Engine input and output ports into DFlow. In one embodiment there is exactly one XFInput or XFOutput instance for each input or output chunk on the Engine, although it may be conceivable that alternative arrangements may be useful. Each instance of XFInput holds a reference to an XFLink, a private header copy, an event to use instead of the trace event and a port name. Each instance of XFOutput holds a reference to an XFLink, a reference to the output header, an event to use instead of the trace event, a busy chunk and a port name.

TABLE K

| Type | Name | Description |
| --- | --- | --- |
| HXFLink | link | The link that supplied the buffer. |
| XEngHeaderStruct* | hdr | Our own input header, must be freed. |
| XEngEvent* | event | Link event, if not NULL use instead of trace event. |
| XTSTR | name | A port name. |

TABLE L

| Type | Name | Description |
| --- | --- | --- |
| HXFLink | link | The downstream link. |
| XEngHeaderStruct* | hdr | Reference to the header for this output. |
| XEngEvent* | event | Link event, if not NULL use instead of trace event. |
| HXFBuf | busyChunk | The busy Engine owned buffer. |
| XTSTR | name | A port name. |

Figure 6:
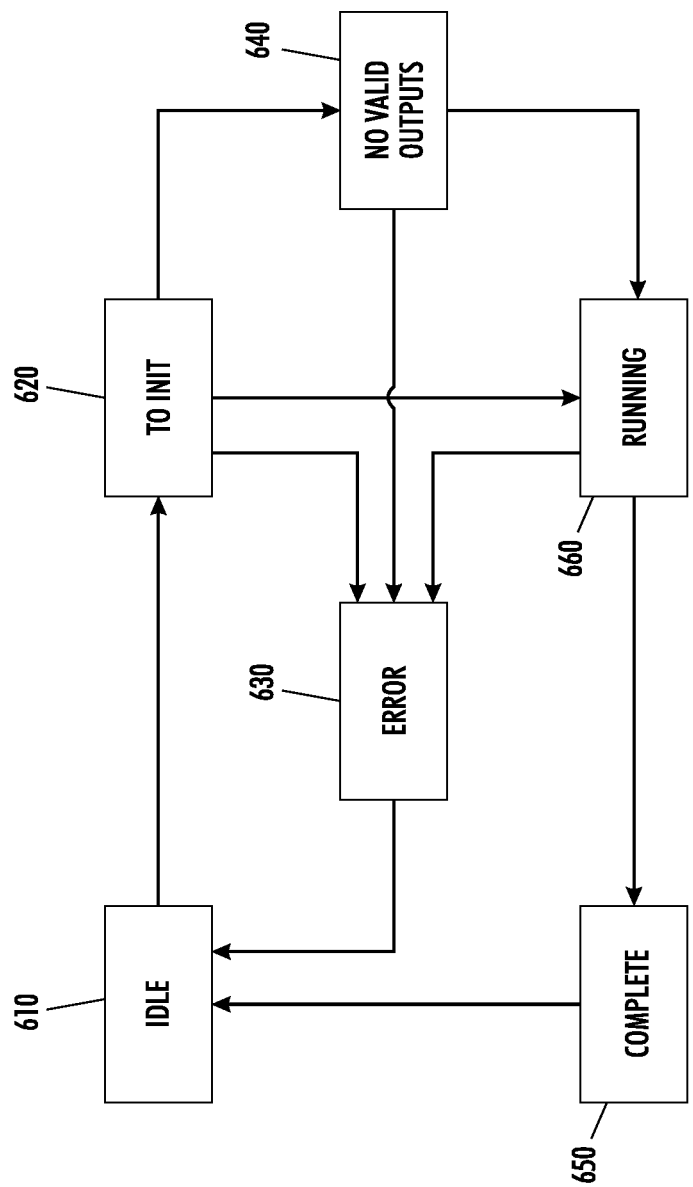

In the detailed dynamic model, for example as depicted in FIG. 6, the XFEng class has six states. The edges shown are for normal operation. It is also possible to return to Idle from any state by calling Cleanup. The states are as follow:

Idle (610)—The initial state on creation. This is the state before Start and after Cleanup.

To Init (620)—The initial state after Start. The instance is ready to be initialized when all of its input headers are available. After initialization, the state will move to No Valid Outputs, Running, or Error as appropriate.

No Valid Outputs (640)—The instance has successfully initialized, but has set the "XENG_OUTPUTS_NOT_VALID_SFLAG" flag. It can accept input, but will not produce any output. It will stay in this state until it clears the flag or signals an error.

Running (660)—The instance has successfully initialized and cleared the "XENG_OUTPUTS_NOT_VALID_SFLAG" flag. The availability of output headers is determined by the "XENG_OUTPUT_NOT_VALID_OFLAG" flag on each output port. The instance can accept input and may produce output. It will stay in this state until it completes or flags an error.

Complete (650)—The instance has consumed the entire input stream and produced an entire output stream. Its process point shall not be called again, but its end point has not been called yet. It will remain in this state until Cleanup is called.

Error (630)—The instance has produced an error. Its process point shall not be called again, but its end point has not been called yet. It will remain in this state until Cleanup is called.

An XFEng, in the functional model, is responsible for hosting an Engine instance and managing its state and data flow. To do this, it provides methods to start, run, and cleanup the Engine. To manage the data flow for an Engine, an XFEng must handle the inbound and outbound motion of XFBufs. XFBufs as described below. When the XFEng_Start method is called and the XFEng is in the Idle state 610, it is moved to the ToInit state 620. Otherwise, the method returns XF_FAIL.

When the XFEng_Cleanup method is called, the XFEng is cleaned up and returned to the Idle state 610. When the XFEng_Process method is called, the behavior depends on the current state. The Idle 610, Complete 650, and Error 630 states will return immediately. The other states will proceed as depicted, for example, in FIG. 7.

Figure 7:
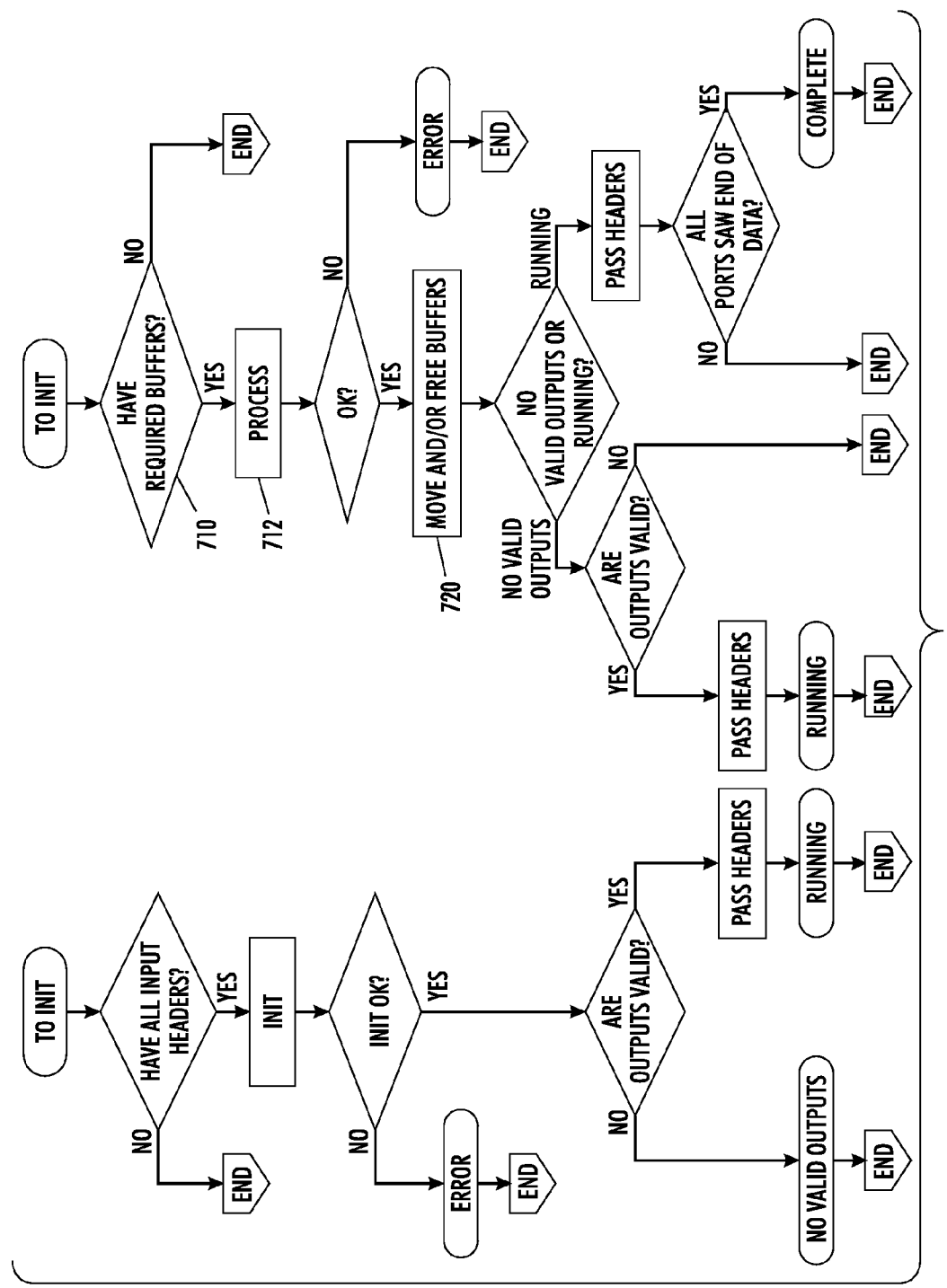
FIG. 7 is an exemplary representation of a flow diagram illustrating stages of a buffer mapping operation in accordance with the disclosed system and method.

Referring to FIG. 7, several stages represent complex activities. The details of those steps are expanded in the following description. In the "Have Required Buffers?" stage 710, the system analyzes the input and output arrays. If there is no pending input, the Engine did not do any work on its last Process call, and the Engine is not a Source, so it is skipped. If not skipping, and the Engine supports migratable buffers, then migratable buffers are allocated for each output that is not throttled (all downstream links do not want any more data). If an output is throttled, then allocate a NULL migratable buffer. If not skipping and the Engine does not support migratable buffers, then skip the Engine if any busy flags are set or any output is throttled.

Relative to the "Move and/or Free Buffers" stage 720, an XEngChunk is a buffer descriptor that resides on each input and output "port" of an Engine. As a buffer passes through a port, the description of that buffer is copied into or out of the relevant XEngChunk. Since the descriptor is owned by the Engine, it cannot travel with the buffer. To allow buffer migration, and to track non-migratable buffers, DFlow creates an XFBuf wrapper for each buffer. During the call to the Process point 712, a reference to the XFBuf is stored in the XEngChunk's User Data field.

After the Process call 712 returns, the inputs and outputs are scanned for buffers that need to be moved and/or freed. Depending on the XENG_MIGRATE_SFLAG, buffer chunks left on inputs may be released. In non-migrate mode, XFBuf_Done is called unless the buffer has been passed through to an output. In migrate mode, the XENG_FINISHED_CHUNK flag indicates that a buffer should be released, otherwise it is left alone.

Non-NULL buffer chunks left on outputs are moved to the output XFLink(s). If an output has multiple branches, then the buffer chunk must be duplicated and distributed appropriately. A further optimization may be implemented when a buffer is marked with the Read Only flag. These buffers may be shared on the downstream branches using a reference counting mechanism.

The held queue is scanned for buffers with their XENG_FINISHED_CHUNK flag set. Any buffers with the flag set are released.

Lastly, at various points, the XFEng needs to pass headers from the Engine's output to the downstream links where they may be read by the next Engine(s) in the pipeline. The actual header is not copied during this process, only a reference is copied.

In one embodiment of the disclosed system and method, an XFLink is the connection between two XFEng instances. The XFLink also contains a thread-safe FIFO (to hold any buffers passing down the pipeline) and references to the source and destination XFEng instances. Given that each XFEng is responsible for getting and putting buffers from/to its links, the source and destination references are used primarily for allowing a link to cleanly remove itself from the pipeline and also to help serialize the links to external storage. The following are more descriptive characterizations of aspects of the XFLink functionality: Table M is a characterization of the XFLink data members; Table N is a characterization of the XFLink methods; and Table O suggests that XFLink contains the XFLinkEnd class.

TABLE M

| Type | Name | Description |
|---|---|---|
| XEngCriticalSection* | cs | The mutex for this link. |
| XFList<HXFBuf> | queue | The list of XFBufs currently queued on this link. XFBufs will be added to the queue at the tail and removed at the head. |
| unsigned | wantsDataThreshold | The threshold at which this link will vote to apply backpressure. If all the links connected to a single output unanimously vote for backpressure, then the output is throttled. Default is 1. |
| XFBool | threadBreak | A flag to indicate that the downstream Engine should be executed in a different thread from the upstream one if multithreading is enabled. Default is false. |
| XEngHeaderStruct* | hdr | A reference to the XEngHeader that applies to the data flowing through this link. |
| XFLinkEnd | src | The XFEng and chunk index for the Engine producing buffers for this link. |
| XFLinkEnd | dst | The XFEng and chunk index for the Engine consuming buffers from this link. |

TABLE N

| Return Type | Name | Parameters | Description |
|---|---|---|---|
| XFResult | XFLink_New | unsigned wantsDataThreshold XFBool threadBreak HXFEng src unsigned srcIx HXFEng dst unsigned dstIx HXFLink *pLink | Creates and initializes a new XFLink. If wantsDataThreshold is set to XF_MAX_DEPTH, the link will request up to UINT_MAX buffers. This disables all backpressure on this link. |
| void | XFLink_Delete | HXFLink link | Removes this link from the DAG and cleans up the references to it in the source/dest XFEng instances. |
| XFResult | XFLink_PutBuf | HXFLink link HXFBuf buf | Adds a buffer to the queue. |
| XFResult | XFLink_TakeBuf | HXFLink link HXFBuf *pBuf | Removes a buffer from the queue. |
| XFBool | XFLink_IsEmpty | HXFLink link | Returns an XFBool indicating that the queue is empty. |
| XFBool | XFLink_WantsData | HXFLink link | Returns an XFBool indicating that the link wants more buffers. |
| XFBool | XFLink_IsFull | HXFLink link | Returns an XFBool indicating that the queue is full. |

TABLE O

| Type | Name | Description |
|---|---|---|
| HXFEng | instance | Reference to the XFEng instance to which this link is connected. |
| unsigned | chunkIx | Index of the connected chunk on that XFEng. |

In the dynamic model of XFLink, when the FIFO contains no XFBufs, XFLink_IsEmpty will return XF_TRUE. When the FIFO contains fewer than wantsDataThreshold XFBufs, XFLink_WantsData will return XF_TRUE, and when there are XF_MAX_DEPTH XFBufs in the FIFO, XFLink_IsFull will return XF_TRUE.

Functionally, XFLink is intended to act as an intermediary between two XFEng instances, either in the same or in independent threads. Each call to query or modify the queue state is protected by a mutex. The PutBuf method will append a new Buf to the tail of the queue. The call will return XF_FAIL if the queue is already full. If the queue is going from empty to non-empty, the downstream Engine is signaled ready to run. The TakeBuf method will remove a Buf from the head of the queue. The call will return XF_FAIL if the queue is already empty. If the queue is going from not wanting to wanting data, the upstream Engine is signaled ready to run.

Considering the XFBuf functionality referred to above, attention is now turned to the detailed design of the XFBuf.

An XFBuf is an XEngChunk descriptor with the added ability to be linked into lists and to be returned to a buffer manager. Since an Engine buffer is just a block of memory with no associated descriptor, an XFBuf is created to describe the buffer and travel with it between Engines. An XFBuf is created by an XFBufMgr. The following tables set forth the detailed object model for the XFBuf: Table P characterizes the XFBuf Data Members; and Table Q characterizes the XFBuf Methods.

The XFBuf class does not have any states or state transition events, and an XFBuf is created and owned by an XFBufMgr (see below). The XFBuf is passed around amongst the XFEng instances until it is not needed any more. At that time, the last XFEng will call XFBuf_Done and return the buffer to its owner.

TABLE P

| Type | Name | Description |
|---|---|---|
| XEngChunk | chunk | An instance of the XEngChunk structure. This is used to carry the chunk values from one Engine to the next and preserve them when the buffer is queued. |
| unsigned | alignment | The alignment of the data block in this buffer. |
| HXFBufMgr | bmObj | The handle to the XFBufMgr that created this buffer. This is used to free the buffer. |
| void* | bmData | The XFBufMgr private data. |
| unsigned | refs | The reference count to this XFBuf. |

TABLE Q

| Return Type | Name | Parameters | Description |
|---|---|---|---|
| XFResult | XFBuf_NewRef | HXFBuf buf HXFBuf *newRef HXFLogger pLog | Creates a new reference to the XFBuf. This will set the XFBuf to be ReadOnly and increment the reference count. |
| XFResult | XFBuf_Validate | HXFBuf buf HXFLogger pLog | Checks an XFBuf for validity. This may include checking that chunkBytes <= chunkSize and that no guard band violations have occurred. |
| void | XFBuf_Done | HXFBuf buf HXFLogger pLog | Returns control of an XFBuf to the XFBufMgr that created it. If the reference count of the XFBuf is greater than one, the count is decremented and the XFBuf is not freed. |

The XFBufMgr is responsible for creating XFBufs and accepting them back when the XFBuf's Done method is called. What happens when Done is called depends on which XFBufMgr created the XFBuf. XFBufMgr is an abstract class. At least two concrete classes shall be derived from XFBufMgr, one for migratable and one for non-migratable buffers. The present system and method further contemplate an additional XFBufMgr that may be created to handle client owned buffers.

Table R, Table S, Table T, Table U, and Table V provide further information relative to the detailed object model for the XFBufMgr. Table R sets forth the data members. Table S indicates that XFMigratableBufMgr adds a data member, whereas XFNonMigratableBufMgr does not add any data members. In Table T, the XFBufMgr defines the indicated methods for the base class. Table U characterizes the virtual methods XFMigratableBufMgr implements, and adds two more, whereas Table V characterizes the virtual methods XFNonMigratableBufMgr implements and also adds two more.

TABLE R

| Type | Name | Description |
|---|---|---|
| unsigned | type | The derived class flag. This allows dynamic type checking of XFBufMgr derived types. |
| XEngCriticalSection* | cs | The mutex for the buffer manager. |
| XFList <HXFBuf> | inUse | The inUse list. This list tracks all the buffers issued by this buffer manager and allows garbage collection at cleanup. |
| unsigned | sizeErrors | The number of times that the buffer validator method detected chunkBytes > chunkSize. |

TABLE S

| Type | Name | Description |
|---|---|---|
| HXFBuf | free | The head pointer to the free list. Released buffers are held here until they can be reused. |
| unsigned | beforeErrors | The number of times a violation was detected on the guard band before an XFBuf. |
| unsigned | afterErrors | The number of times a violation was detected on the guard band after an XFBuf. |

TABLE T

| Return Type | Name | Parameters | Description |
|---|---|---|---|
| void | virtual XFBM_Delete | HXFBufMgr bufMgr | Pure virtual function. See derived class for implementation. |
| XFResult | virtual XFBM_BufValidate | HXFBufMgr bufMgr HXFBuf buf HXFLogger pLog | Pure virtual function. See derived class for implementation. |
| void | virtual XFBM_BufDone | HXFBufMgr bufMgr HXFBuf buf HXFLogger pLog | Pure virtual function. See derived class for implementation. |

TABLE U

| Return Type | Name | Parameters | Description |
| --- | --- | --- | --- |
| XFResult | XFMigratableBufMgr__New | HXFBufMgr *pBufMgr | Creates a new XFMigratableBufMgr. |
| void | virtual XFBM__Delete | HXFBufMgr bufMgr | Deletes all XFBufs in the free list and deletes this instance of the XFBufMgr |
| XFResult | XFmigratableBufMgr__Alloc | HXFBufMgr bufMgr XFSize size unsigned alignment HXFBuf *pBuf HXFLogger pLog | Allocates a migratable XFBuf (or chooses one from the free list) and returns it to the caller. size specifies the minimum size of the new buffer. If there is an existing XFBuf on the free list from 100 to 110% of the requested size, that XFBuf will be returned. Otherwise, a new one will be allocated. alignment specifies that the allocated data block should be aligned on the requested boundary. This value must be a power of 2. pBuf receives the HXFBuf. |
| XFResult | XFMigratableBufMgr__Dup | HXFBufMgr mgr HXFBuf buf HXFBuf *pBuf HXFLogger pLog | Duplicates an XFBuf. A new migratable XFBuf is allocated (or selected from the free list) and the contents of buf are copied into it. The duplicate XFBuf is returned in pBuf. The new buffer will retain all existing data and flags of the original except: The MIGRATE flag will be set, and the FINISHED, NONMOVEABLE, and READONLY flags will be clear. |
| XFResult | virtual XFBM__BufValidate | HXFBufMgr bufMgr HXFBuf buf HXFLogger pLog | Validates that chunkBytes <= chunkSize and scans for any guard band violations. |
| void | virtual XFBM__BufDone | HXFBufMgr bufMgr HXFBuf buf HXFLogger pLog | Places the specified XFBuf onto the free list. |

TABLE V

| Return Type | Name | Parameters | Description |
| --- | --- | --- | --- |
| XFResult | XFNonMigratableBufMgr__New | HXFBufMgr *pBufMgr | Creates a new XFNonMigratableBufMgr. |
| void | virtual XFBM__Delete | HXFBufMgr bufMgr | Deletes this instance of the XFBufMgr |
| XFResult | XFNonMigratableBufMgr__Track | HXFBufMgr bufMgr HXFEng xeng HXFOutput output XEngChunk *chunk HXFBuf *pBuf HXFLogger pLog | Creates an XFBuf to track an Engine allocated buffer. This buffer will be non-migratable. xeng refers to the XFEng that owns the buffer being tracked. The Ready flag of the XFEng will be cleared. output refers to the XFOutput that is issuing the buffer. The busy flag of the XFOutput will be set. chunk is the chunk holding the description of the buffer to be tracked. pBuf receives the XFBuf handle. Note: this call will return XF__FAIL if the busy flag of the XFOutput is already set. |

TABLE V-continued

| Return Type | Name | Parameters | Description |
|---|---|---|---|
| XFResult | virtual XFBM_BufValidate | HXFBufMgr bufMgr HXFBuf buf HXFLogger pLog | Validates that chunkBytes <= chunkSize. |
| void | virtual XFBM_BufDone | HXFBufMgr bufMgr HXFBuf buf HXFLogger pLog | Clears the busy flag of the XFOutput that issued the buffer and signals the XFEng Ready to run. Deletes the XFBuf instance. |

The XFBufMgr class does not have any states or state transition events. Functionally, the two buffer managers will be used in slightly different ways.

If an Engine has set its migratable support flag, the Migratable buffer manager will be called before the Engine's process point in order to provide buffers for each of the Engine's outputs. When the Engine releases the buffer, it will be moved to the downstream link or discarded as appropriate. Alternatively, if an Engine does not set its migratable support flag, the Non-Migratable buffer manager may be called after the Engine's process point to provide an XFBuf wrapper for each new output buffer generated by the Engine. In the case where the buffer coming out the output was passed through from an input, the original XFBuf will be located on that input and reunited with the buffer before passing onto the XFLink.

Attention is now turned to the XFScheduler detailed design. The XFScheduler class is responsible for dividing the DAG into executable traces and then running those traces in zero or more threads depending on the client request. If the client specifies zero threads, then it must call DFlow_Process (which calls XFScheduler_Process) to execute the trace. The object model for the XFScheduler is set forth below in Table W (Members) and Table X (Methods).

TABLE W

| Type | Name | Description |
|---|---|---|
| XEngMutex * | mutex | The mutex that protects the thread manager. |
| XFSchedCtrl | control | The control flag for XFScheduler. It can be set to: Stop, SingleStep, OneLoop. |
| unsigned | maxThreads | The maximum number of scheduler threads that may be created to execute traces. The legal values are: 0: Create no threads. Only one trace will be created and it can only run when the client calls the Process method. >0: Create up to this many threads and any number of traces. Assign the traces to the threads in sequence. XF_UNLIMITED_THREADS : Create any number of threads and traces. |
| XFList <HXFEng> * | pEngines | A reference to the list of Engines in the DAG. |
| XFParamMap | paramMap | The Param Map is built at scheduler init time from the client-supplied parameter substitution list. It is used during the initialization of each Engine to supply actual values for any parameter macros. |
| HXFBufMgr | mBufMgr | Handle to the XFBufMgr object responsible for allocating and recycling migratable buffers for the pipeline. |
| HXFBufMgr | nmBufMgr | Handle to the XFBufMgr object responsible for tracking buffers allocated by individual Engines. |
| XEngConditional * | cvLoop | An event flag (CV). This event occurs at the completion of each scheduling cycle to signal a waiting client thread to check for initialization or completion. |
| XEngConditional * | cvDone | An event flag (CV). A thread will raise this event before exiting. This allows a client waiting to stop the scheduler to synchronize the joining of multiple threads while still allowing for a timeout. |
| XFArray <HXFThread> | threads | An array of threads. The number of threads created depends on the value of maxThreads and the actual number of scheduler traces created. There shall never be more threads than traces. |
| XEngConditional * | cvReady | An event flag (CV). This event signals that at least one XFEng within an inactive trace has transitioned to the Ready state. All extra threads will wake up and check to see if they are needed to run the trace. |
| XEngCriticalSection * | csTrace | The critical section to protect the trace queue independently of the object mutex. |

TABLE W-continued

| Type | Name | Description |
|---|---|---|
| unsigned | nTraces | The number of traces in the trace queue. |
| HXFTrace | traceHead | A queue of available traces. The traces will be removed from the list by a thread wishing to execute them and returned to the list when the thread has completed its cycle. |
| HXFTrace * | traceTail | The tail of the trace queue. |
| XEngInt64 | startTime | The performance counter value at the last call to SetCtrl (Start). |
| XEngInt64 | elapsedTime | The cumulative overhead of the scheduler so far. |
| unsigned | nThreads | The multiplier for the thread-time calculation. |
| XEngIO * | anaLog | The handle to the Analyzer log file. Is NULL if not logging. |
| XEngInt64 | baseTime | The start time of the Analyzer log. |
| double | perfScale | The performance clock scalar. |
| XFPerfMonitor | perfMon | The performance monitor. |

TABLE X

| Return Type | Name | Parameters | Description |
|---|---|---|---|
| XFResult | XFScheduler_Init | HXFScheduler scheduler XFList *pEngines unsigned maxThreads char *paramList[ ] XFPerfCallbacks *cbacks XCTSTR log Base | Initializes a pre-allocated XFScheduler instance. pEngines is a reference to the Engines in the DAG. maxThreads indicates the maximum number of threads to create. paramList specifies the Parameter substitution list to use. This is in the XEngArgList format. cbacks references the performance callback functions. logBase is the base pathname for the performance logfiles. |
| XFResult | XFScheduler_Cleanup | HXFScheduler scheduler | Cleans up an XFScheduler. |
| XFResult | XFScheduler_LogErrorMsg | HXFScheduler scheduler XTSTR msg . . . | Appends another error message to an XFScheduler. |
| XFResult | XFScheduler_GetErrorMsg | HXFScheduler scheduler XTSTR *msg | Returns the current error message from an XFScheduler. May return NULL if no message is stored. |
| XFResult | XFScheduler_SetCtrl | HXFScheduler scheduler XFSchedCtrl newCtrl XFSchedCtrl *pOldCtrl unsigned timeout | Sets the scheduler control state to the new value specified by the client. The previous state is returned. If the state is going from stop to run, the scheduler will create traces and start running them (in multi-thread mode). If the state is going from start to stop, the scheduler will kill all threads and delete all traces. This call will block until the state change completes or timeout occurs. |

TABLE X-continued

| Return Type | Name | Parameters | Description |
|---|---|---|---|
| XFResult | XFScheduler_GetCtrl | HXFScheduler scheduler XFSchedCtrl *pCtrl | Returns the current control state in pCtrl. |
| XFResult | XFScheduler_PutTrace | HXFScheduler scheduler HXFTrace trace | Puts a trace at the tail of the trace queue. |
| XFResult | XFScheduler_TakeTrace | HXFScheduler scheduler HXFTrace *pTrace | Removes a trace from the head of the trace queue. |
| XFResult | XFScheduler_Process | HXFScheduler scheduler XFBool singleStep | Executes the next trace. |
| XFResult | XFScheduler_WaitForInit | HXFScheduler scheduler HXFEng xeng unsigned timeout | Waits for the specified xeng to leave the ToInit state or timeout occurs. timeout specifies the maximum wait in milliseconds. |
| XFResult | XFScheduler_WaitForComplete | HXFScheduler scheduler unsigned timeout XFBool *pAllComplete XFBool *pErrorDetected | Waits for all Engines to move to the Complete state or any Engine to move to the Error state. timeout specifies the maximum wait in milliseconds. If all Engines are complete at return time, pAllComplete will be XF_TRUE, otherwise, it will be XF_FALSE. If any Engine generates an error, pErrorDetected will be XF_TRUE, otherwise it will be XF_FALSE. |
| static XFResult | XFScheduler_SetLoop | HXFScheduler scheduler | Called by a thread at the end of each scheduler cycle. This allows a client to efficiently wait for a change of state. |
| static XFResult | XFScheduler_SetDone | HXFScheduler scheduler | Called by a thread when it exits. This allows a client waiting for SetCtrl(Stop) to detect the exit and join. |
| XFResult | XFScheduler_SetReady | HXFScheduler scheduler XFBool ready unsigned *pnReady XFBool *pReady | Called by a Trace when the ready status of an XFEng is changing. This method provides a thread-safe clearinghouse for status changes. It will also wake up sleeping threads if the number of Ready Traces increases. |
| void | XFScheduler_AnalyzerLog | HXFScheduler scheduler unsigned value const char *fmt . . . | Creates an entry in the performance analyzer log. value is the value to be logged. fmt is the string to tag this log entry. It may contain printf style |

TABLE X-continued

| Return Type | Name | Parameters | Description |
|---|---|---|---|
| | | | format specifiers which will be filled from the variable argument list . . . |
| void | XFScheduler_StateEvent | HXFScheduler scheduler HXFEng xeng XFEngState state | Called when an XFEng changes state. The event will be relayed to the client if it registered a monitoring callback,. |
| void | XFScheduler_DataEvent | HXFScheduler scheduler HXFEng xeng XFBool isInput unsigned port unsigned bytes unsigned tBytes unsigned scanlines unsigned tScans unsigned blobs | Called when an XFEng receives or sends a block of data. The event will be relayed to the client if it registered a monitoring callback. |

The XFScheduler contains three internal classes, XFPerfMonitor, XFThread and XFTrace. Table Y through Table EE set forth the characteristics of these internal classes.

TABLE Y

XFPerfMonitor Data members

| Type | Name | Description |
|---|---|---|
| XFPerfCallbacks | cbacks | The set of client callback functions. |
| XFBool | useQueue | The flag to enable queuing. Events are queued and deferred in multi-threaded mode. Otherwise, they are delivered immediately and the following fields (mutex - done) are ignored. |
| XEngMutex * | mutex | The mutex to protect the event queue. |
| XEngConditional * | cv | The cv to synchronize the event queue. |
| XFList <HXFPEvent> | queue | The event queue. |
| XEngThread | thread | The event delivery thread. |
| volatile XFBool | done | The flag to kill the event delivery thread. |

TABLE Z

XFPerfCallbacks Data Members

| Type | Name | Description |
|---|---|---|
| HXFStateEventFunc | stateFunc | The client callback function for state change events. |
| void * | stateData | The client data to use on state change callbacks. |
| HXFDataEventFunc | dataFunc | The client callback function for data events. |
| void * | dataData | The client data to use on data callbacks. |

TABLE AA

XFPerfMonintor Methods

| Return Type | Name | Parameters | Description |
|---|---|---|---|
| void | XFPerfMon_DeliverEvent | HXFPerfMonitor pm HXFPEvent event | Delivers an event to the client. |

TABLE AA-continued

XFPerfMonintor Methods

| Return Type | Name | Parameters | Description |
| --- | --- | --- | --- |
| XEngThreadExitVal | XFPerfMon_Dispatch | XEngVoid *arg | The event dispatcher thread. Only used when deferring events. |
| void | XFPerfMon_Init | HXFPerfMonitor pm XFPerfCallbacks *cbacks XFBool useQueue | Initialize the performance monitor. |
| void | XFPerfMon_Cleanup | HXFPerfMonitor pm | Cleanup the performance monitor. |
| void | XFPerfMon_Event | HXFPerfMonitor pm HXFPEvent event | Either queue or deliver an event depending on the current mode of operation |
| void | XFPerfMon_StateEvent | HXFPerfMonitor pm HXFEng xeng XFEngState state | Package a state event for queuing or delivery. This is the public entry point for a state event. |
| void | XFPerfMon_DataEvent | HXFPerfMonitor pm HXFEng xeng XFBool isInput unsigned port unsigned bytes unsigned tBytes unsigned scanlines unsigned tScans unsigned blobs | Package a data event for queuing or delivery. This is the public entry point for a data event. |

TABLE BB

XFThread Data Members

| Type | Name | Description |
| --- | --- | --- |
| XEngThread | id | The ID of the thread. This is used for joining with the thread. |
| HXFScheduler | scheduler | A reference back to the parent class. |
| XFBool | done | A Done flag. The thread sets this before exiting. |

TABLE CC

XFThread Methods

| Return Type | Name | Parameters | Description |
| --- | --- | --- | --- |
| XFResult | XFThread_New | HXFScheduler scheduler HXFThread *pThread | Creates a new thread instance. |
| void | XFThread_Delete | HXFThread thread | Deletes a thread instance. |
| XFResult | XFThread_Start | HXFThread thread | Starts the thread instance. |
| XFResult | XFThread_Join | HXFThread thread | Joins with the thread. Will fail if the thread is not done. |
| XFBool | XFThread_IsDone | HXFThread thread | Indicates whether the thread is done and ready to join. |

TABLE DD

XFTrace Data Members

| Type | Name | Description |
| --- | --- | --- |
| unsigned | id | The id number of this Trace. |
| HXFScheduler | scheduler | A reference to the parent XFScheduler. |
| unsigned | nReady | The number of XFEngs in this Trace that are ready to run. |
| unsigned | currentXFEng | The index of the next XFEng to be executed in this trace. |

TABLE DD-continued

XFTrace Data Members

| Type | Name | Description |
|---|---|---|
| XFArray<HXFEng> | Engines | The array of XFEngs in this trace. |
| HXFTrace | next | Pointer to the next Trace in the queue. |

TABLE EE

XFTrace Methods

| Return Type | Name | Parameters | Description |
|---|---|---|---|
| XFResult | XFTrace_New | HXFTrace *pTrace | Creates a new trace instance. |
| void | XFTrace_Delete | HXFTrace trace | Deletes a trace instance. |
| XFResult | XFTrace_Add | HXFTrace trace HXFEng engine | Adds an XFEng to the trace. |
| XFResult | XFTrace_Process | HXFTrace trace const XFParamMap *paramMap XFBool singleStep | Executes the trace. If the singleStep flag is true, then only one XFEng will be executed. Otherwise, the trace will execute of its XFEngs once. |
| XFResult | XFTrace_SetReady | HXFTrace trace XFBool ready XFBool *pReady | Called when the ready state of an XFEng is changing. This method calls its parent scheduler to perform the actual status change. |

The XFScheduler has three states based on its control setting:
Stop—Stop and join all threads, delete all traces.
Single Step—Create traces and threads, call XFTrace_Process with the Single Step flag set. This means that the trace can be rescheduled to a new thread after running only one Engine. It also means that the traces will respond to the stop condition quickly.
One Loop—Create traces and threads, call XFTrace_Process with the Single Step flag clear. This means that the trace will run all of its Engines before being rescheduled or responding to the stop condition.

Functionally, when DFlow is placed in the Run state, one or more scheduler traces are created to execute portions of the DAG. A number of threads are created to execute the traces from the trace pool. The lesser of the number of traces and maxthreads determines the number of threads to create.

If maxThreads is 0 or 1, all Engines are placed in a single trace. To create scheduler traces, DFlow follows these steps:
1) Create a new trace object.
2) Search the Engine list for an unscheduled Source (an Engine with zero inputs). If there are no sources but still unscheduled Engines, then search for a ThreadBreak leading to an unscheduled Engine. Add the selected Engine to the current trace. If no unscheduled Engines can be located, then exit after discarding an empty trace object.
3) Follow the links from that Engine and add each Engine to the trace until hitting a Sink, ThreadBreak, or previously scheduled Engine. (Note: ThreadBreaks are only respected in the multi-thread case.) If any given Engine has multiple outputs, queue up the other outputs to be followed later on within this trace. Once all branches have been followed to completion, this trace is complete.
4) If this is the multi-trace mode, create a new trace object. Otherwise, reuse the current trace.
5) Go back to (2).

The method for executing traces differs between the client thread mode and the independent thread modes. In the client thread mode, since no threads are created, the scheduler cannot do anything independently. It must wait until the client calls DFlow_Process, which then calls XFScheduler_Process, which then calls XFTrace_Process. In the limited-thread mode, the scheduler creates up to maxThreads threads (but no more than there are traces). Those threads take the trace from the head of the list, execute it in the mode specified by the scheduler control (SingleStep or OneLoop), return it to the tail of the list, and repeat. And, in the unlimited-thread mode, the scheduler creates the same number of threads as there are traces. These threads each execute a single trace. Note that unlimited mode is simply the limited mode with no maxthreads restriction. The same thread-trace assignment model is used.

To kill traces, the control flag is set to Stop. The next time a thread returns to the scheduler to exchange its trace, it will exit. The thread that called XFScheduler_SetCtrl(Stop) will block until all threads have joined or a timeout occurs. It should be appreciated that the unusual selection of types for the head and tail pointers in the Trace queue is intended as an optimization. It eliminates all but one test from the append and remove operations.

Init (New):
  head=NULL;
  tail=&head;
Append (PutTrace):
  *tail=trace; tail=
  &trace->next;
  trace->next=NULL;
Remove (TakeTrace):
  *pTrace=head;
  head=head->next;
  if (!head)
    tail=&head;
  (*pTrace)->next=NULL;</screen>

Lastly, XFParams is a class responsible for keeping track of an XFEng's parameter set as well as translating a parameter template into an argument list compatible with an Engine Init function. The XFParams class provides the methods for parsing the parameter template string, but the client must provide an ArgList containing the mappings between any value macro names and their actual values.

Using the XFParams class takes several steps:
1) Create a set of parameters or templates using XFParams_Add or by loading an XML pipeline description. The DFlow client will do this.
2) Create an instance of XFParamMap from an ArgList style macro substitution list. The DFlow client must supply the ArgList when calling DFlow_PipeRun, DFlow will convert it to an XFParamMap.
3) Call XFParams_CreateArgv to create the final ArgList to be handed to an Engine's Init method.

The following tables (Table FF-Table KK) characterize the detailed object model for the XFParams (e.g., XFParams is a renamed instance of XFArray, the array holds objects of type HXFParam):

TABLE FF

XFParams

| Type | Name | Description |
|---|---|---|
| XTSTR | name | The name of the parameter. |
| XTSTR | value | The value of the parameter. |

TABLE GG

XFParamMap

| Type | Name | Description |
|---|---|---|
| XTSTR | name | The name of the parameter. |
| SpecType | spec | The data type of this parameter. E.g. Int, Double, String . . . |
| XFArray <void *> | values | The array of parameter values. |

TABLE HH

XFArgList

| Type | Name | Description |
|---|---|---|
| XTSTR | name | The name of the argument. |
| unsigned | count | The array size of this argument. Positive values indicate a fixed number of parameters. 0 represents a variable length array. |
| SpecType | spec | The data type of this argument. E.g. Int, Double, String . . . |

TABLE II

XFParams Methods

| Return Type | Name | Parameters | Description |
|---|---|---|---|
| XFResult | XFParams_Init | XFParams *pParams | Initializes the XFParams instance. |
| void | XFParams_Cleanup | XFParams *pParams | Cleans up the XFParams instance. |
| XFResult | XFParams_Add | XFParams *pParams XCTSTR name XCTSTR value . . . | Adds the specified parameter to the instance. The name and value strings are duplicated internally. If the value string contains any printf style format specifiers, they are substituted with values from the variable argument list (. . .). |
| XFResult | XFParams_Copy | XFParams *dstParams const XFParams *srcParams | Duplicates the contents of srcParams into dstParams. The previous contents of dstParams are discarded. |
| unsigned | XFParams_GetCount | const XFParams *pParams | Gets the number of parameters in this instance. |
| HXFParam | XFParams_Get | const XFParams *pParams unsigned index | Returns a reference to the parameter at position index of the array. |
| void | XFParams_Dump | const XFParams *pParams HXFLogger pLog XFLogLevel level | Dumps the contents of the instance to the log at the specified level. |
| void | XFParams_DumpArgs | char *args[ ] HXFLogger pLog XFLogLevel level | Dumps the contents of the XEng style argList (args) to the log at the specified level. This is useful for verifying the correct resolution of all macros before they are used to initialize an Engine. |
| XFResult | XFParams_CreateArgv | const XFParams *pParams const XFParamsMap *paramMap | Converts the parameters in pParams into the ArgList referenced by argList. |

TABLE II-continued

XFParams Methods

| Return Type | Name | Parameters | Description |
|---|---|---|---|
| | | const XEngFuncDesc *desc<br>char *argList[ ]<br>XEngSmartObject **garbage<br>HXFLogger pLog | Any macros in the parameters are substituted using the mappings in paramMap. The conversion process may generate some allocated garbage that must be freed after the argList is consumed by the Engine's Init function. |

TABLE JJ

XFParamMap Methods

| Return Type | Name | Parameters | Description |
|---|---|---|---|
| XFResult | XFParamMap_Init | XFParamMap *paramMap<br>char *paramList[ ] | Initializes the XFParamMap instance. The value mappings contained in paramList are converted into an XFParamsMap. |
| void | XFParamMap_Cleanup | XFParamMap *paramMap | Cleans up the XFParamMap and frees any allocated storage. |

TABLE KK

XFArgList Methods

| Return Type | Name | Parameters | Description |
|---|---|---|---|
| XFResult | XFArgList_Init | XFArgList *pArgList | Initializes the XFArgList instance. |
| void | XFArgList_Cleanup | XFArgList *pArgList | Cleans up the XFArgList and frees all allocated storage. |
| XFResult | XFArgList_AddArgs | XFArgList *pArgList<br>const XFParams *pParams<br>const XEngFuncDesc *desc<br>HXFLogger pLog | Parses the parameter set in pParams to locate any macros. The types of the macros are derived from desc and the resulting formal argument is merged with pArgList. |
| XFResult | XFArgList_ExportArgDesc | const XFArgList *pArgList<br>char ***argDesc | Exports the current contents of pArgList as an array of strings. This array may be stored directly in the args field of an XEngFuncDesc. |

The XFParams class does not have any states or state transition events. However, functionally XFParams provides two methods of parsing a parameter template set. CreateArgv takes a parameter set as an input and converts it to an Engine style ArgList. It also detects macros in the parameter set and inserts appropriate references to the actual values when building the ArgList. GetArgDesc takes a parameter set as an input and locates all the macros. The compiled set of macros is then exportable as an argument descriptor list.

It may also be noted that, from a data structure perspective, the disclosed method and system contemplate that the DFlow DAG may be serialized to an XML file. Further contemplated herein is the addition of a DAG "Expert". For example, a callback system may be implemented where registered "Experts" will be given the opportunity to modify a DAG prior to it executing. Examples of possible "Experts" include: an auto-formatting module that will insert the correct engines to account for required image formats to other engines; and an auto-thread breaking module that will insert thread breaks such that the DAG executes more efficiently on the given platform (especially multi-CPU/core systems).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing image data, comprising:
   providing a threaded scheduler to break up an image processing pipeline into a collection of traces;
   defining a multi-trace directed acyclic graph to represent the collection of traces for processing image data into a plurality of traces, wherein each trace is a fragment of the directed acyclic graph; and
   using at least one processor, executing the multi-trace directed acyclic graph wherein each trace is executed in a separate thread, where the execution of at least one of the plurality of traces is related to an execution state of another one of the plurality of traces.

2. The method of claim 1, wherein executing the multi-trace directed acyclic graph utilizes a plurality of processors in a multi-processor system, where the plurality of processors are spread across multiple networked computers.

3. The method of claim 1, wherein defining a multi-trace directed acyclic graph comprises:
   automatically creating a new trace for each source found; and
   growing each new trace by following links out from each source.

4. The method of claim 1, wherein the image data includes a plurality of chunks of image data and where said chunks of image data comprise an integral number of image scanlines.

5. The method of claim 1, wherein said directed acyclic graph includes at least one instance of an engine.

6. The method of claim 4, further including serializing the directed acyclic graph to an extensible markup language file.

7. The method of claim 1, further including a callback system wherein a directed acyclic graph is modified prior to its execution.

8. The method of claim 1, wherein the multi-trace directed acyclic graph is dynamically modified, during the processing of image data and where the threaded scheduler regenerates the traces before continuing.

9. The method of claim 1, wherein when placed in a run state, a plurality of traces are created to execute portions of the directed acyclic graph, and where the lesser of the number of traces and a pre-defined value determines the number of threads to create.

10. A system for processing image data in a networked computing environment, comprising:
    an image data source;
    a host system, connected to said image data source via the network, wherein said host system includes an image processing pipeline comprising a dataflow scheduler to break up an image processing pipeline into a collection of traces, a multi-trace directed acyclic graph to represent the collection of traces, said pipeline operating on chunks of image data from said source where the execution of at least one of the plurality of traces is related to an execution state of another one of the plurality of traces; and
    memory for storing said chunks of image data during and upon completion of processing of the data by the pipeline.

11. The system of claim 10, said dataflow scheduler interfacing with at least one node within the image-processing pipeline.

12. The system of claim 11, wherein the dataflow scheduler describes, runs, and controls the input of image data to said image-processing pipeline.

13. The system of claim 11, wherein said system further comprises:
    a directed acyclic graph manager describing engines and the data flow links between the engines; and
    a buffer manager handling the storage of chunks of image data.

14. The system of claim 11 wherein said pipeline operates within an engine layer, and wherein said dataflow scheduler controls the operation of at least one node in said engine layer.

15. The system of claim 13, wherein the host system includes a plurality of processors executing the directed acyclic graph and where the plurality of processors are spread across at least one network.

16. A multi-layer image processing pipeline implemented via software stored in a memory operating on at least one processor having access to the software stored in the memory, the pipeline comprising:
    a client layer;
    a dataflow layer, said dataflow layer including at least one interface and service to describe, run, and feed the image-processing pipeline operating on the at least one processor, where the image-processing pipeline is described and stored via said client layer, wherein said dataflow layer further comprises a directed acyclic graph manager, allowing a client to describe nodes and edges of a directed acyclic graph, wherein the nodes represent engines and the edges represent the data flow links between them, a buffer manager for handling a plurality of chunk buffers, and a scheduler for dividing the directed acyclic graph into executable traces, and creating threads to run the executable traces; and
    an engine layer, wherein said dataflow layer controls the operation of at least one node in said engine layer.

17. The image processing pipeline of claim 16, wherein the chunk buffers are selected from the group consisting of: migratable, non-migratable, and client-owned chunks of data.

18. The image processing pipeline of claim 16, wherein the dataflow layer further comprises:
    an editor to describe an image processing pipeline;
    memory to save a description of an image processing pipeline;
    a memory interface to load a previously saved description; and
    a processor interface to run the currently loaded description, and extract performance statistics.

19. The image processing pipeline of claim 18, wherein the client layer runs the pipeline using a method including feeding an input image to the pipeline as a chunked stream and retrieving chunks interactively.

20. The image processing pipeline of claim 16 further including a plurality of processors in a multi-processor system, said processors executing the threads of the multi-trace directed acyclic graph.

* * * * *